United States Patent
Nishimura et al.

(10) Patent No.: US 6,896,977 B2
(45) Date of Patent: May 24, 2005

(54) METHOD OF BRAZING ALUMINUM OR ALUMINUM ALLOY MATERIALS AND ALUMINUM ALLOY BRAZING SHEET

(75) Inventors: Shinya Nishimura, Fujisawa (JP);
Yutaka Yanagawa, Tokyo (JP);
Takeyoshi Doko, Tokyo (JP);
Yoshiharu Hasegawa, Kariya (JP);
Haruhiko Miyachi, Kariya (JP); Kouji Hirao, Kariya (JP)

(73) Assignee: Furukawa-Sky Aluminum CORP, Tokyo (JP)

( * ) Notice: Subject to any disclaimer, the term of this patent is extended or adjusted under 35 U.S.C. 154(b) by 0 days.

(21) Appl. No.: 10/807,398

(22) Filed: Mar. 24, 2004

(65) Prior Publication Data
US 2004/0238605 A1 Dec. 2, 2004

Related U.S. Application Data

(63) Continuation of application No. PCT/JP02/10184, filed on Sep. 30, 2002.

(30) Foreign Application Priority Data

Sep. 28, 2001 (JP) .................................... 2001-303143
May 1, 2002 (JP) .................................... 2002-130157

(51) Int. Cl.$^7$ .......................... B32B 15/20; B23K 1/20; B21D 53/02
(52) U.S. Cl. .............. 428/654; 29/890.03; 29/890.045; 29/890.046; 29/890.049; 165/177; 165/905; 228/203; 228/214; 228/218; 228/219; 228/223; 228/262.51; 428/636; 428/686; 428/926
(58) Field of Search .................................. 426/654, 636, 426/686, 926; 165/177, 905; 29/890.03, 890.045, 890.046, 890.049; 228/203, 214, 218, 219, 223, 262.51

(56) References Cited

U.S. PATENT DOCUMENTS

| | | | | |
|---|---|---|---|---|
| 5,069,980 A | * | 12/1991 | Namba et al. | 428/654 |
| 5,839,646 A | | 11/1998 | Duda et al. | 228/183 |
| 6,329,075 B1 | | 12/2001 | Nener et al. | 428/654 |
| 2002/0037426 A1 | | 3/2002 | Yamada et al. | 428/654 |

FOREIGN PATENT DOCUMENTS

| | | |
|---|---|---|
| EP | 0 637 481 A1 | 2/1995 |
| JP | 64-044267 | 2/1989 |
| JP | 03-133569 | 6/1991 |
| JP | 5-065582 | 3/1993 |
| JP | 9-85433 | 3/1997 |

OTHER PUBLICATIONS

PCT International Search Report for PCT/JP02/10184; Jan. 14, 2003.
International Search Report, European Patent Office, Application No. 02 80 0285, Oct. 28, 2004.

* cited by examiner

*Primary Examiner*—Robert R. Koehler
(74) *Attorney, Agent, or Firm*—Westerman, Hattori, Daniels & Adrian, LLP

(57) ABSTRACT

A method of brazing an aluminum or aluminum alloy material, containing brazing an aluminum alloy brazing sheet that has an aluminum or aluminum alloy core material and, being clad on one or both surfaces, a filler alloy layer comprised of an Al—Si-based alloy and contains Mg incorporated at least in a constituent layer except the filler alloy layer, thereby to form a hollow structure whose one surface clad with the filler alloy is the inner surface, wherein the brazing is carried out in an inert gas atmosphere without applying any flux; and an aluminum alloy brazing sheet which satisfies the relationship: $(X+Y) \leq a/60+0.5$ and $X > Y$, wherein a ($\mu$m) represents the thickness of the filler alloy layer clad on the core material of the inner side of the hollow structure, and X and Y (mass %) represent the Mg contents of the core material and the brazing material, respectively.

28 Claims, 9 Drawing Sheets

METHOD OF BRAZING ALUMINUM OR ALUMINUM ALLOY MATERIALS AND ALUMINUM ALLOY BRAZING SHEET

This application is a continuation of international application No. PCT/JP02/10184, filed on Sep. 30, 2002.

TECHNICAL FIELD

The present invention relates to a method of brazing aluminum or aluminum alloy materials and an aluminum alloy brazing sheet that are preferable for forming coolant paths of aluminum alloy heat exchangers for automobile and various industrial uses. Specifically, the present invention relates to a method of brazing without coating the inside of a tube with flux. Also, the present invention relates to an aluminum alloy brazing sheet that enables a brazing joint for the inside of a hollow structure without using flux in an inert gas atmosphere (for example, nitrogen, argon, etc.).

BACKGROUND ART

Generally, in manufacture of aluminum alloy heat exchangers, the brazing process using Al—Si-based alloy is carried out as a method of jointing the component aluminum members. Especially in the brazing process using aluminum alloy sheets as materials, a so-called aluminum alloy brazing sheet, which is an aluminum alloy composite material that is made into a sheet material by laying a filler alloy made of Al—Si-based alloy on the surface of a core material made of aluminum alloy, is used. For example, a brazing sheet made of aluminum alloy core material clad with Al—Si-based filler alloy on its both sides is used for a coolant path composing a core of an automobile evaporator.

FIG. 1 is a perspective view of an example of a basic structure of the assembled state of a tube fin portion of the evaporator core having an inner fin. FIG. 1 shows the inside of the core in a section. As shown in the figure, a tube material 11 in which a coolant path 16 is set up and formed, and a corrugated inner fin material 13 is installed in the coolant path 16, and an outer fin material 12 for which aluminum alloy sheet material is corrugated and installed on the outside of the core, are assembled alternately one on top of another. Reference number 14 in the figure is the inner joint portion of the tube material 11, and 15 shows the joint portion where the corrugated inner fin material 13 installed in the coolant path 16 is joined with the tube material 11.

In FIG. 1, the side to which the inner joint portion 15 where the inner fin material 13 and the tube material 11 are joined belongs, or the side to which the tube joint portion 14 belongs, is called an inside of the hollow structure, and the side where the outer fin material 12 and the tube material 11 are joined is called an opening portion. Likewise, in the structure of the drawn cap shown in FIG. 7, the side of the inner joint portion 74 of the drawn cap is called the inside of the hollow structure, and the outer joint portion 75 of the drawn cap is called the opening portion.

In order to braze brazing sheets, it is necessary to destroy the hard oxide film generated on the surface of the filler alloy during braze heating. The brazing method can be classified largely into two: the vacuum brazing method conducted in high vacuum and the NB (nocolok brazing) method using flux.

Of these two methods, the vacuum brazing method conducted in high vacuum is the method of brazing without using flux. In this method, it is indispensable to contain about 1.5% by mass of Mg in the filler alloy of the brazing sheet. Mg destroys the hard oxide film of the filler alloy when it evaporates from the brazing sheet by braze heating. Further the evaporated Mg plays the role as getter that removes oxygen and moisture remaining in the furnace. As a result, brazing is made possible by the vacuum brazing method conducted in a high vacuum.

This vacuum brazing method enables brazing even for a very complicated structure, but the problem is that costly large-scale equipment must be used to control the atmosphere. Another problem is that the effect of sacrificial corrosion prevention due to Zn cannot be obtained because the Zn that was added in the material evaporates in the vacuum brazing method.

Meanwhile, the brazing method in an inert gas atmospheres using noncorrosive flux (hereinafter to be referred to as NB method), which is currently the mainstream method, makes brazing possible as the flux destroys the oxide film of the filler alloy. In this method, braze heating is conducted in an inert gas atmosphere, and flux coating on the surface of the filler alloy is indispensable.

Moreover, since this method uses noncorrosive flux for in-furnace brazing in an inert gas atmosphere, it is easy to control the oxygen concentration of the furnace atmosphere by using an inert gas. Accordingly brazing can be easily conducted on an industrial scale. Further, since noncorrosive flux is used, it is not necessary to remove the flux after braze heating. Thus, this method is most widely used especially in the manufacture of heat exchangers for automobile.

In the aluminum alloy brazing by the NB method, flux is indispensable to remove the oxide film formed on the surface of the aluminum alloy, and flux must be touched to the joint portion before melting the filler alloy. However, in the heat exchanger with the structure as shown in FIG. 1, if flux is applied after assembling the tube material and the inner fin material, brazing could be defective because flux does not spread sufficiently in the tube. Therefore, flux must be applied at a stage of material or press-molded parts before assembled to the core. In this procedure, handling tube materials coated with flux is bothersome, and defective brazing easily occurs as flux can not evenly spread to necessary portions, each of which are not desirable for industrial purposes.

Further, since the residue of flux remains in the tube of the heat exchanger core brazed in this manner, the tube is sometimes clogged with the residue of flux, which could cause performance degradation of the heat exchanger.

In order to solve the above problems, a method of brazing the inside of the tube without applying flux has been proposed. In this method, brazing is conducted without flux in an inert gas atmosphere of atmospheric pressure, using a filler alloy that contains 0.2% to 1.5% by mass of Mg further in the Al—Si series filler alloy generally used in the NB method (Specification of U.S. Pat. No. 5,839,646). Accordingly, it is possible to braze the inside of a hollow structure such as a tube without coating with flux. However in this method, minute amounts of oxygen existing in the furnace atmosphere reacts with Mg contained in the filler alloy during braze heating and forms Mg oxide film on the surface of the filler alloy, so it is necessary to reduce the oxygen concentration in the furnace atmosphere. In the conventional NB method, brazing is possible by making the oxygen concentration of the furnace atmosphere 200 ppm or less. In contrast, in the method in which Mg is contained in the filler alloy, the oxygen concentration of the brazing furnace atmosphere must be about 10 ppm or less and thus this method is not industrially practical. Moreover, since brazing must be done in strictly regulated brazing atmosphere to an oxygen concentration of about 10 ppm or less, unstable brazing performance occurs in the portion where complete atmosphere substitution is difficult such as the deep inside of the tube. Further especially a portion such as around the opening of the tube, which is exposed to the flow of the furnace atmosphere, is easy to be affected by the oxidizing atmosphere, and deposition of MgO is remarkable there. Alternatively the flux atmosphere coming from outside and the Mg in the filler alloy react each other. This makes problems of the impossibility of brazing in the portion such as around the tube opening easily affected by the furnace atmosphere.

In another brazing method, the whole members to be brazed are put inside a housing, in which, for example, Mg is placed, to enable no-flux brazing in an inert gas atmosphere. (Japanese Patent Laid-Open No. JP-A-9-85433). In this method, brazing is conducted on the condition of covering a member to be brazed with a Mg-added material or placing pure Mg inside of the housing. In yet another method, brazing heat exchanger members placed in a housing is conducted, where Mg is added to the filler alloy of the member to be brazed or to the structural material of the member to be brazed.

In the method using the Mg in the housing or using the Mg placed inside the housing, evaporation of Mg hardly occurs due to brazing under atmospheric pressure, and surely brazing is difficult since the amount of Mg reaching the portion to be brazed is extremely small. On the other hand, in the method in which brazing the heat exchanger members placed in the housing is conducted, where use is made of a material in which Mg is added to the filler alloy of the item to be brazed or to the structural material of the item to be brazed, the member to be brazed must be placed inside of the housing every time of brazing, and this is an inefficient method for industrial production.

Further, besides the above brazing methods, there is another method of inert gas atmosphere brazing called VAW method in which flux is not used. In this method, brazing is enabled in an inert gas atmosphere by adding minute amounts of Bi, Sb, Ba, Sr, Be, etc. to filler alloys and destroying and removing the oxide film on the surface of the filler alloy by means of alkali etching or acid etching before braze heating. However in this method, the atmosphere must be strictly controlled to a dew point of −65° C. or less and an oxygen concentration of 5 ppm or less. Moreover, pretreatment of material is necessary and strict control of the atmosphere is necessary, so this method is not suitable in terms of practical use.

Recently, as slimming down of material progresses, the thickness of filler alloy is also decreasing. Since the decrease in quantity of filler alloy to be used tends to degrade the brazing quality, it has become necessary to secure a good brazing quality even in the case of using thin filler alloy.

Thus, still there remain problems to solve in brazing for industrial manufacture of heat exchangers.

It is an object of the present invention to provide an industrially efficient method of brazing aluminum or aluminum alloy materials and also a brazing sheet suitable for this method, whereby the above-mentioned existing problems are solved and brazing can be easily conducted without coating with flux in the tube where applying flux is difficult in the NB method.

It is another object of the present invention to provide a brazing sheet that has a low occurrence rate of a break in a brazing portion (defect owing to insufficient supply of filler alloy) even in the case of a thin clad filler alloy, in the method that enables no-flux brazing of the inside of a hollow structure, by using a brazing sheet containing Mg in the component member.

Other and further objects, features and advantages of the invention will appear more fully from the following description, taken in connection with the accompanying drawings.

DISCLOSURE OF THE INVENTION

Figure 1:
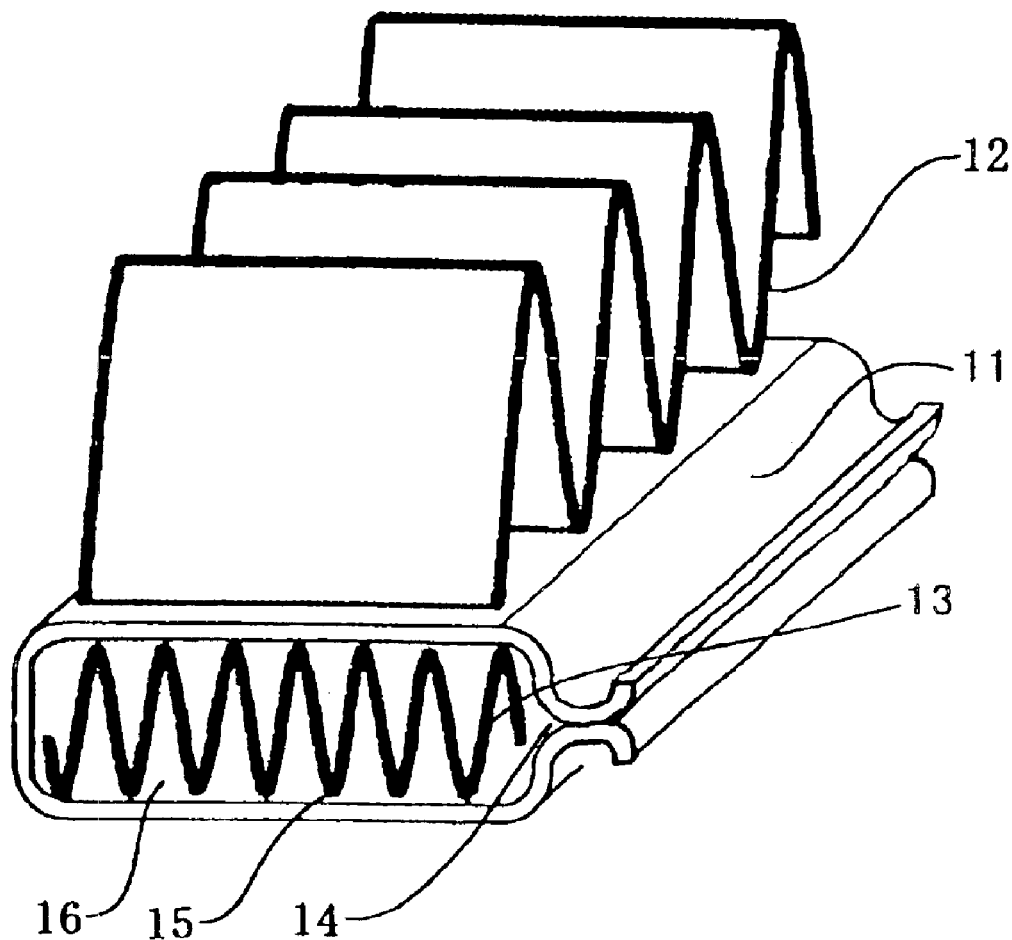
FIG. 1 is a perspective view explaining an example of the heat exchanger core assembled with the tube material that composes the coolant path, and the inner fin and the outer fin.

The present inventors, as a result of close studies, have found that the above problems can be solved by the following means:

That is, the present invention provides:

(1) A method of brazing aluminum or aluminum alloy materials, which comprises:

keeping one side of a clad surface of a filler alloy of an aluminum alloy brazing sheet inside a brazing assembly;

forming the brazing sheet to constitute a hollow structure; and carrying out brazing on the inside of the formed hollow structure without applying flux in an inert gas atmosphere, wherein said sheet has an aluminum or aluminum alloy core clad with a filler alloy layer composed of an Al—Si-based alloy on one side or both sides thereof, and contains Mg at least in a layer constituting the brazing sheet other than the filler alloy layer;

(2) The method of brazing aluminum or aluminum alloy materials according to the above item (1), which further comprises: brazing in an inert gas atmosphere by using flux, in an opening portion other than the inside of the hollow structure;

(3) An aluminum alloy brazing sheet, which is suitable to the brazing method according to the above item (1) or (2), wherein one side or both sides of the aluminum or aluminum alloy core material is clad with the Al—Si-based alloy filler alloy, and a cladding thickness a ($\mu$m) of the filler alloy applied on the inside of the hollow structure, a Mg content X (mass %) of the core material, and a Mg content Y (mass %) of the filler alloy satisfy relationships of $(X+Y) \leq a/60 + 0.5$ and $X>Y$;

(4) The aluminum alloy brazing sheet according to the above item (3), wherein the Mg content of the filler alloy applied on the inside of the hollow structure is less than 0.2% by mass, and the Mg content of the core material is 0.05 to 1.0% by mass;

(5) The aluminum alloy brazing sheet according to the above item (3) or (4), wherein the cladding thickness a ($\mu$m) of the filler alloy applied on the inside of the hollow structure, the Mg content X (mass %) of the core material, and the Mg content Y (mass %) of the filler alloy satisfy relationship of $(X+Y) \leq -a/60 + 1.5$;

(6) An aluminum alloy brazing sheet, which is suitable to the brazing method according to the above item (1) or (2), wherein said sheet has a structure of at least 4 layers claded in the sequence of a filler alloy, a diffusion prevention layer, a core material and a filler alloy, and said core material has a composition containing 0.2 to 1.2% by mass of Si, 0.05 to 2.0% by mass of Fe, 0.1 to 1.2% by mass of Cu, 0.05 to 2.0% by mass of Mn and 0.2 to 1.5% by mass of Mg, with the balance being Al and inevitable impurities;

(7) The aluminum alloy brazing sheet according to the above item (6), wherein the filler alloy on the side adjacent to the diffusion prevention layer (hereinafter to be referred to as an outer filler alloy) is an Al—Si-series filler alloy, and the filler alloy on the side adjacent to the core material (hereinafter to be referred to as an inner filler alloy) contains 7 to 12% by mass of Si, 0.5 to 8.0% by mass of Cu and 0.5 to 6% by mass of Zn, with the balance being Al and inevitable impurities;

(8) The aluminum alloy brazing sheet according to any one of the above items (3) to (7), wherein said sheet is a brazing sheet for use in a heat exchanger; and (9) A method of manufacturing an aluminum alloy heat exchanger, comprising using the method of brazing aluminum or aluminum alloy materials according to the above item (1) or (2).

Here, "Mg is added at least to the brazing sheet composing layer other than the filler alloy layer" means including both the case that, if Mg is added to the brazing sheet composing layer other than the filler alloy layer, the filler alloy layer itself does not contain Mg, and the case that the filler alloy layer itself also contains Mg.

BEST MODE FOR CARRYING OUT THE INVENTION

The present invention will be described in detail below.

In the present invention, the mechanism of no-flux brazing is as follows:

As mentioned above, in the vacuum brazing method of the conventional technique carried out in high vacuum, the hard oxide film of the filler alloy is destroyed when Mg in the filler alloy of the brazing sheet evaporates from the brazing sheet by braze heating. Further, the evaporated Mg plays a role of getter removing the oxygen and moisture remaining in the furnace. These make brazing of the heat exchanger members possible.

In contrast to this, in the present invention, evaporation of Mg hardly occurs if brazing is carried out under atmospheric pressure, for example, and the reducing action of the oxidizing atmosphere in the furnace by evaporation of Mg hardly occurs. Therefore, only the portion very close to the surface of the filler alloy adjacent to the brazing sheet composing layer added with Mg is in a non-oxidizing atmosphere at which brazing is possible. In order to carry out brazing under atmospheric pressure, it is necessary to preserve this condition to prevent reoxidation of the filler alloy during brazing. It is necessary to create a hollow structure like the inside of a tube, for example, so as not to be affected by outside atmosphere.

Thus, an action of Mg is making the least possible non-oxidizing atmosphere that is necessary to prevent reoxidation of the filler alloy during brazing. There is another important action, namely, the reducing action by Mg to reduce the aluminum oxide on the surface of the filler alloy. That is, by the reducing action shown by the following formula:

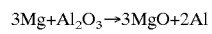

$$3Mg + Al_2O_3 \rightarrow 3MgO + 2Al$$

the oxide film of aluminum on the surface of the filler alloy is destroyed and brazing becomes possible. In the present invention, using the above reducing reaction enables no-flux brazing of the inside of the hollow structure.

In the conventional technique where the brazing sheet composed of Al—Si—Mg series filler alloys are used for no-flux brazing of the inside of hollow structure, the Mg in the filler alloy is exposed to an oxidizing atmosphere from the beginning of braze heating. Therefore, by the reduction of the non-oxidizing atmosphere around the opening portion that is apt to be affected by the furnace atmosphere, MgO is deposited on the surface of the filler alloy during braze heating, so brazing is hindered.

In contrast to this, the brazing method of the present invention is a method in which Mg is added at least to the brazing sheet composing layer (for example, core material) other than the filler alloy layer and Mg is diffused into the filler alloy layer during braze heating to carry out no-flux brazing. In this method, the aluminum oxide is reduced by Mg, so Mg does not reach the surface of the material (to be brazed) until fillet is formed. As a result, Mg can be prevented from being directly oxidized by the oxidizing atmosphere outside of the material and deposited as MgO. Further even if the brazing atmosphere is bad, especially in the part such as the tube opening portion, which is apt to be affected by the furnace atmosphere, brazing can be carried out satisfactorily. In the brazing method of the present invention, it is preferable to carry out the brazing using the inner filler alloy in an inert gas atmosphere (for example, nitrogen gas or argon gas).

Next will be described the brazing sheet that can be used in the present invention with reference to the drawings.

The brazing sheet that can be used in the present invention is the aluminum alloy brazing sheet in which Mg is added at least to the brazing sheet composing layer (for example, core material) other than the filler alloy layer.

Figure 2:
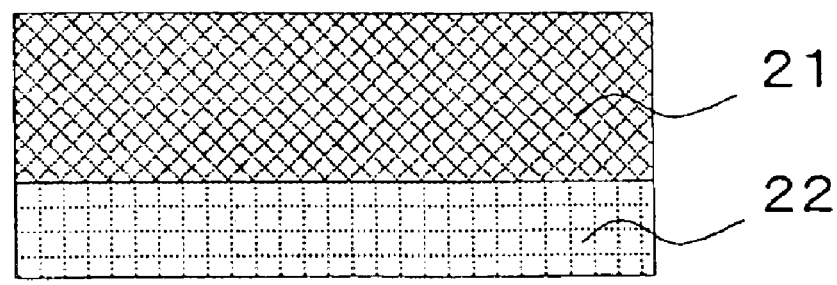
FIG. 2 is a cross sectional view showing an example of the aluminum alloy brazing sheet of the present invention.

FIG. 2 is a cross sectional view showing an example of preferable embodiment of the aluminum alloy brazing sheet of the present invention. Reference number 21 in the drawing is the core material containing Mg, and 22 is the filler alloy (hereinafter to be referred to as an inner filler alloy) that comes to the inside of the hollow structure at the forming stage (i.e. the side where brazing is carried out without coating with flux).

Figure 3:
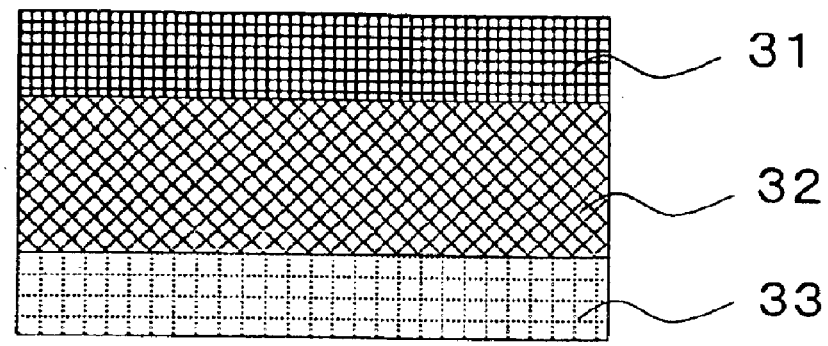
FIG. 3 is a cross sectional view showing another example of the aluminum alloy brazing sheet of the present invention.

FIG. 3 is a cross sectional view showing another example of preferable embodiment of the aluminum alloy brazing sheet of the present invention. In the drawing, reference number 31 is the filler alloy (hereinafter to be referred to as an outer filler alloy) that comes to the side of open portion (i.e. the side where brazing is carried out using flux) complimentary to the inside of the hollow structure at the stage of forming. Reference number 32 is the core material containing Mg, and 33 is the inner filler alloy.

In FIG. 3, the alloy compositions of the outer filler alloy 31 and the inner filler alloy 33 may be the same or different from each other.

Figure 4:
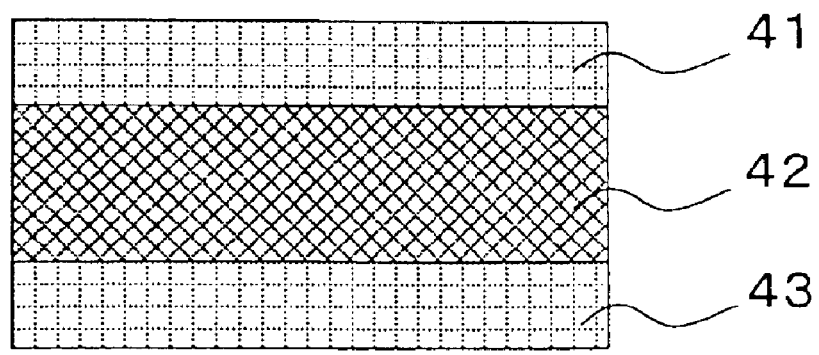
FIG. 4 is a cross sectional view showing another example of the aluminum alloy brazing sheet of the present invention.

FIG. 4 is a cross sectional view showing another example of preferable embodiment of the aluminum alloy brazing sheet of the present invention. In the drawing, reference number 41 is the first inner filler alloy, 42 is the core material containing Mg, and 43 is the second inner filler alloy. The brazing sheet shown in FIG. 4 can be used also as an inner fin material on the inside of the tube (coolant path) of a heat exchanger, for example.

In FIG. 4, the alloy compositions of the first and the second inner filler alloys 41 and 43, respectively may be the same or different from each other.

Figure 5:
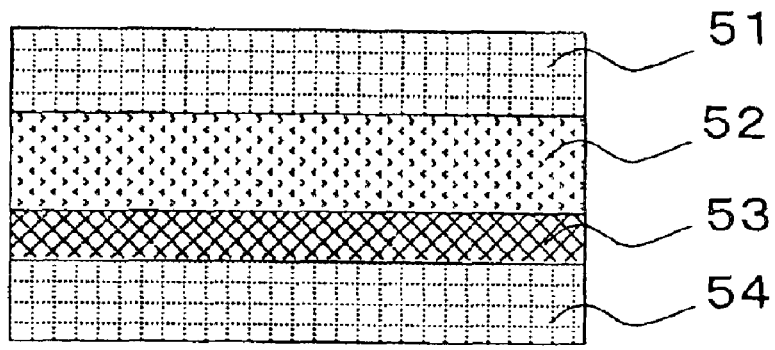
FIG. 5 is a cross sectional view showing another example of the aluminum alloy brazing sheet of the present invention.

FIG. 5 is a cross sectional view showing another example of preferable embodiment of the aluminum alloy brazing sheet of the present invention. In the drawing, reference number 51 is the outer filler alloy, 52 is the diffusion prevention layer, and 53 is the core material that can contain a suitable amount of Mg. 54 is the inner filler alloy.

Figure 6:
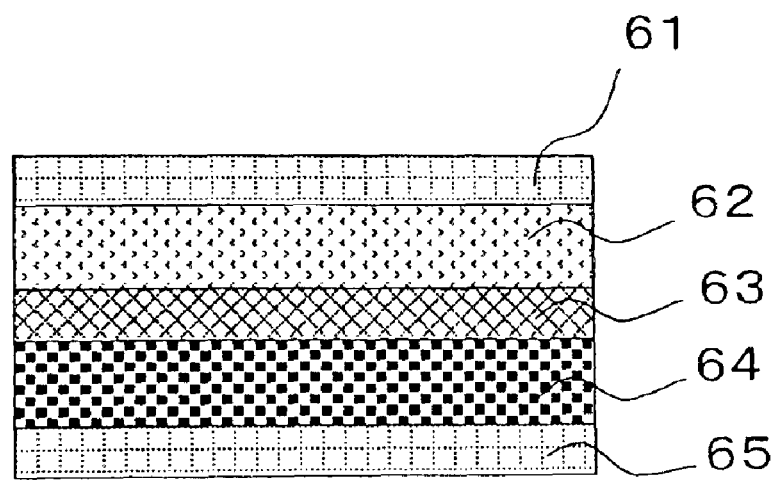
FIG. 6 is a cross sectional view showing another example of the aluminum alloy brazing sheet of the present invention.

FIG. 6 is a cross sectional view showing another example of preferable embodiment of the aluminum alloy brazing sheet of the present invention. In the drawing, 61 is the outer filler alloy, 62 is the diffusion prevention layer, 63 is a core material that can contain a suitable amount of Mg. Reference number 64 is a diffusion control layer. Reference number 65 is the inner filler alloy.

In FIGS. 5 and 6, the alloy compositions of the outer filler alloys (51 and 61) and the inner filler alloys (54 and 65) may be the same or different from each other.

As described above, FIGS. 2 to 6 show some examples of the brazing sheets that can be used in the present invention. As for the example of FIG. 2, the core material can be suitably clad with a sacrificial corrosion prevention layer on the opposite side to the inner filler alloy in consideration of corrosion resistance. Further in the example of FIG. 2, the core material can be suitably clad with a sequence of a diffusion prevention layer and a sacrificial layer on the opposite side to the inner filler alloy in consideration of corrosion resistance and the brazing quality of the outer side.

Further, as shown in the example of FIG. 6, the core material can be suitably clad with a diffusion control layer under the inner filler alloy.

Further, in the present invention, a brazing sheet may have, for example, a 4-layer structure with the sequence of an inner filler alloy, a diffusion control layer, a core material, and a sacrificial corrosion prevention layer, or a 4-layer structure omitting the diffusion prevention layer from the example shown in FIG. 6.

However, the brazing sheets that can be used in the present invention are not limited to the above configurations.

One embodiment of the present invention is an aluminum alloy brazing sheet that has a core material and a filler alloy respectively containing Mg with a combination of the suitable contents of Mg, in consideration of the thickness of the filler alloy. Even if the thickness of the filler alloy is thinner, the brazing sheet has an excellent no-flux brazing quality of the inner side. As such examples, the above brazing sheets shown in FIGS. 2 to 5 are illustrated.

Now will be described the reason for limiting the content of Mg in each brazing sheet member in the present invention.

Recently, with the slimming down tendency of the heat exchanger, the thickness of the filler alloy has become thinner. When the thickness of the filler alloy becomes so thinner, excessive Mg is supplied to the surface of the filler alloy due to the diffusion from the core material during braze heating. Due to the auto-oxidation of the excessively supplied Mg, the brazing quality is lowered. So, in order to prevent the auto-oxidation of Mg before braze melting, it is necessary to control Mg that reaches the outermost surface of the filler alloy during braze heating. In the present invention, the clad thickness of the filler alloy can be made thinner without lowering the brazing quality of no-flux brazing, by satisfying a relationship among the clad thickness a ($\mu$m) of the filler alloy on the inside of the hollow structure (the inner filler alloy), the Mg content X (mass %) of the core material, and the Mg content Y (mass %) of the filler alloy, of:

$(X+Y) \leq a/60+0.5$.

Further, containing Mg in the core material and the filler alloy with a relationship Y (Mg content in the filler alloy)<X (Mg content in the core material) causes the Mg in the core material to diffuse during braze heating to the filler alloy on the side where no-flux brazing is carried out, and by this action of Mg, the oxide film of aluminum on the surface of the filler alloy is destroyed. At this time, since Mg is diffused from the core material, there is no unnecessary oxidation by the brazing atmosphere. Therefore, a good brazing quality is assured. If the contents are keeping the relationship Y (Mg content in filler alloy)>X (Mg content in the core material), the diffusion of Mg proceeds from the filler alloy to the core material. Then the Mg that is necessary when the filler alloy is melting cannot be supplied and the brazing quality is lowered.

To carry out no-flux brazing using the inner filler alloy, the Mg content of the core material is preferably 0.05% by mass or more, and more preferably 0.1% by mass or more. The upper limit of Mg content is preferably 1.0% by mass or less. Further, the Mg content of the core material is preferably 0.1 to 0.8% by mass. If the Mg content of the core material is too high, Mg diffuses excessively, which sometimes causes an adverse effect to the brazing quality. On the other hand, if the content is too low, no sufficient effect can be seen on the oxide film destroying action on the surface of the filler alloy.

In the present invention, the Mg content of the core material is not limited to the above range. For example, as will be described below, the content can be determined within a different range from those described above, depending on the embodiment of the aluminum alloy brazing sheet.

Further, in the case of carrying out the outer brazing, the reaction of the Mg added to the core material with the flux should be taken into consideration.

In the case of the brazing sheets shown in FIGS. 2 to 6, the amount of the Mg added to the core material is preferably 0.4% by mass or less, and more preferably 0.3% by mass or less. Further, it is preferably 0.1% by mass or more.

In the brazing sheet shown in FIG. 2, the amount of the Mg to be added to the core material can be increased according to thickness of a diffusion prevention layer or a sacrificial corrosion prevention layer when the core material is clad with any of those layers.

In the case of the brazing sheets shown in FIGS. 5 and 6, the amount of the Mg to be added to the core material can be suitably adjusted according to the thickness of the diffusion prevention layer. Mg may be added also to the diffusion prevention layer, but the amount is preferably 0.4% by mass or less. More preferably, it is 0.3% by mass or less.

Further, in the case of the brazing sheet shown in FIG. 6, the amount of the Mg to be added to the core material can be adjusted more suitably according to the thickness of the diffusion control layer. The diffusion control layer may contain Mg or not, but if it contains Mg, the preferable content is less than that of the core material. The Mg content of the diffusion control layer is preferably 0.3% by mass or less. When a diffusion control layer is set up, no-flux brazing is possible because the Mg contained in the core material is diffused to the diffusion control layer and further to the inner filler alloy.

Below will be described the reason for specifying the amount of addition of each component for the preferable embodiment of the brazing sheet shown in FIG. 5 in the present invention.

The Si in the core material 53 contributes to improvement of mechanical strength. The Si content is preferably 0.2 to 1.2% by mass. If the Si content is too little, the strength improvement effect will not be sufficient; if too much, the melting point is lowered, resulting in melting during braze heating.

The Fe in the core material has the action of preventing cracks during the forming process, by distributing giant intermetallic compounds into the alloy and making crystal grains fine. The Fe content is preferably 0.05 to 2.0% by mass. If the Fe content is too little, this action will not sufficient; if too much, the formability is lowered, so the brazing sheet cracks during the forming process.

The Cu in the core material exists in the alloy as solid solution after brazing and improves mechanical strength. The Cu content is preferably 0.1 to 1.2% by mass. If the Cu content is too little, a sufficient strength improvement effect cannot be obtained; if too much, the melting point is lowered, resulting in melting during braze heating.

The Mn in the core material is effective because it improves mechanical strength by distributing fine intermetallic compounds in the alloy. The Mn content is preferably 0.05 to 2.0% by mass. If the Mn content is too little, strength improvement will not be sufficient; if too much, the formability is lowered, resulting in cracked brazing sheet during the forming process.

The Mg in the core material diffuses into the inner filler alloy during braze heating as mentioned above, and it becomes possible to braze without coating the inside with flux. The Mg content is preferably 0.2 to 1.5% by mass. If the Mg content is too little, the amount of diffusion into the inner filler alloy is little, so it is impossible to braze without coating the inside with flux. If it is too much, the formability at rolling the alloy is lowered, resulting in difficulty of manufacturing brazing sheets. In the case like the 4-layer material in the present invention, the amount of Mg diffusion into layers other than the inner filler alloy is much, so the amount of Mg to be added to the core material is preferably 0.2% by mass or more. Further in the case of braze heating using a low melting point filler alloy as a filler alloy, it is possible to braze at a temperature lower than a usual temperature by about 20° C. (580° C.), therefore it is possible to suppress occurrence of erosion even if Mg of over 1.0% by mass is added.

The thickness of each layer of the aluminum alloy brazing sheet composed of 4 layers of the present invention is not specifically limited, but it is automatically determined by workability, etc. For example, the diffusion prevention layer is 0.10 to 0.50 mm, the core material is 0.01 to 0.10 mm, the inner filler alloy layer is 0.01 to 0.05 mm, and the outer filler alloy layer is 0.01 to 0.05 mm in thickness, but not being limited to these. Besides, the thickness of the diffusion control layer or the sacrificial anti-corrosion layer is not specifically limited.

In the present invention, the core material of the brazing sheet is not specifically limited. For example, material containing preferable Mg content described here, 3000-series alloys, 1000-series alloys or the like can be used.

Also, the diffusion prevention layer and the diffusion control layer are not specifically limited as long as they are of an aluminum or aluminum alloy. For example, 3000-series or 1,000-series alloys can be used.

Mg of the brazing sheet may be contained in the filler alloy for the inside of the hollow structure, if the amount is very small; but the Mg content is preferably less than 0.2% by mass. If the Mg content in the filler alloy is too much, the Mg on the surface of the filler alloy is remarkably oxidized around the portion near the opening that is apt to be affected by the furnace atmosphere, or in the case that the non-oxidizing atmosphere become worse. Further, even if the thickness of the filler alloy is made thin like in the present invention, it is preferable to lower the Mg content in the filler alloy to obtain a good brazing. Specifically, if the filler alloy thickness becomes 25 µm or less, it is preferable to regulate the Mg content to 0.05% by mass or less. If the content is too much, the brazing quality near the opening of the heat exchanger tube, for example, is lowered by the self-oxidation of Mg. Alternatively, when the thickness of the filler alloy is thin, the fillet formed becomes small.

If a large amount of filler alloy is needed and the thickness of the filler alloy becomes thick, a phenomenon called erosion, where the core material is eroded by the filler alloy, takes place. This phenomenon is noticeable especially when the thickness of the filler alloy is thick and the Mg content is high in the brazing sheet. In the present invention, the erosion after braze heating can be controlled, by satisfying the relation $(X+Y) \leq -a/60+1.5$, for the clad thickness a ($\mu$m) of the filler alloy on the inside of the hollow structure, the Mg content X (mass %) of the core material, and the Mg content Y (mass %) of the filler alloy.

A good brazing quality can be obtained by using Al—Si-based alloys for the filler alloy, and also filler alloys having low melting points such as Al—Si—Zn-based alloys, Al—Si—Cu-based alloys and Al—Si—Cu—Zn-based alloys may preferably be used. If a low melting point filler alloy is used, the filler alloy melts before the auto-oxidation of Mg progresses. Therefore, when the thickness of the filler alloy became thin even if Mg of over 0.05% by mass is added to the filler alloy, a brazing sheet with an excellent brazing quality can be manufactured. Besides, elements such as Ge, Bi, Ag and Ni can be added to the filler alloy in order to lower the melting point.

Below will be described the reason for specifying the amount of each component to be added in the case of using Al—Si—Cu—Zn-based filler alloys in the present invention.

Si lowers the melting point of the filler alloy. The Si content is preferably 7 to 12% by mass. If the content is too little, the melting point is not sufficiently lowered; on the contrary, if it is too much, the melting point goes up, so the brazing quality is lowered. Further, in view of the flowability of filler, the amount of Si to be added is more preferably 8.0 to 11.0% by mass.

Cu lowers the melting point of the filler alloy. The Cu content is preferably 0.5 to 8% by mass. If the content is too little, the melting point is not sufficiently lowered; if too much, the formability at rolling the alloy is lowered, making it difficult to manufacture brazing sheets. So, in view of the flowability of filler, the addition amount of Cu of 1.0 to 3.5% by mass is more preferable.

Zn lowers the melting point of the filler alloy. This Zn content is preferably 0.5 to 6% by mass. If the content is too little, the melting point is not sufficiently lowered; if too much, the formability at rolling the alloy is lowered, making it difficult to manufacture brazing sheets. Moreover, in view of the flowability of filler, the addition amount of Zn of 2.0 to 5.0% by mass is more preferable.

The alloy elements of the filler alloy that can be used in the present invention are as above, but as inevitable impurities, Fe, etc. may be contained within the range wherein the brazing quality is not deteriorated.

In the present invention, the aluminum or aluminum alloy core material is clad with the filler alloy at a predetermined thickness on one side or both sides of the core material, to form a brazing sheet. The clad ratio of this filler alloy is preferably 5 to 30% and more preferably 7 to 20% to the core material on one side.

As shown in the examples in FIGS. 2 to 6, the thickness of each layer of the aluminum alloy brazing sheet of the present embodiment is not specifically limited, but the thickness of the filler alloy is to be generally 5 $\mu$m or more. The thickness of the filler alloy is preferably 80 $\mu$m or less. The thickness of the core material is preferably 0.05 to 2.0 mm.

Especially in a brazing sheet with a thin thickness, when the thickness of the filler alloy is 25 $\mu$m or less, brazing is satisfactory and effective by using the brazing sheet of the present invention.

As for outer filler alloys, usual Al—Si-based filler alloys can be used; for example, the aluminum alloy with the Si content of 7 to 12% by mass can be used. However, if a low melting point filler alloy added with Cu and/or Zn is used as the inner filler alloy, it is preferable to use the low melting point filler alloy added with Cu and/or Zn also as the outer filler alloy, to lower the brazing temperature.

The brazing temperatures of the method according to the prevent invention are not specifically limited, but if the Mg content in the filler alloy layer is from 0.1% by mass to less than 0.2% by mass, 570 to 610° C. is preferable because the melting point of the filler alloy is lowered due to the addition of Mg, and 590 to 600° C. is more preferable. Further, if Cu or Zn is added to the filler alloy layer, 560 to 585° C. is preferable because the melting point of the filler alloy is lowered further more. Further, if the Mg content in the filler alloy layer is regulated to 0.05% by mass or less, 590 to 610° C. is preferable.

In the meanwhile, in the open portion other than the inside of the hollow structure, for example, in order to join the tube material and the outer fin, it is preferable to braze them in an inert gas atmosphere (for example, nitrogen gas or argon gas) using flux, from the viewpoint of industrial and efficient brazing of aluminum or aluminum alloy materials.

The flux that can be used for brazing with flux in an open portion may be a generally used one, for example fluoride-series flux.

The method of brazing aluminum or aluminum alloy materials of the present invention can be used for various purposes. For example, by using the present invention of assembling aluminum or aluminum alloy materials, aluminum alloy heat exchangers of a parallel flow type (for example, the assembly of mini-core shown in FIG. 1) or a drawn cap type (for example, the assembly according to the basic structure shown in FIG. 7), etc. can be manufactured.

According to the method of brazing aluminum or aluminum alloy materials of the present invention, it is possible not only to carry out inner brazing without using flux in the inside of the hollow structure such as the inside of a tube, but also to carry out no-flux brazing satisfactorily in an atmosphere of badly high oxygen concentration, in the case where the atmosphere of the inside of the tube cannot sufficiently be substituted, especially in the portion near the tube opening that is apt to be affected by the furnace atmosphere. Moreover, it is not necessary to set up a brazing member in the housing every time of brazing, and it is possible to simplify the brazing process by a great deal. Therefore, it is possible to carry out an efficient and industrial-scale blazing wherein control of the atmosphere is easy, and besides the brazing process is simplified by a great deal.

As for the brazing sheet for heat exchanger of the present invention that can be preferably used in the brazing process, it is not necessary to limit the oxygen concentration of the brazing furnace to a remarkably low level and it is possible to simplify the brazing process of the heat exchanger by a great deal, so a good and stable brazing quality can be obtained. Further, in particular, even if the thickness of the filler alloy is thin, a good brazing can be carried out. Therefore, we can obtain industrially remarkable effects. The aluminum alloy brazing sheet of the present invention is preferable for automobile heat exchanger members, for example, tube materials of an evaporator, a condenser, an oil cooler, etc. and inner fin materials for those members.

By using the method of brazing aluminum or aluminum alloy materials of the present invention and by using the aluminum alloy brazing sheet of the present invention, we can manufacture aluminum alloy heat exchangers efficiently and industrially.

EXAMPLES

The present invention will be described in more detail based on examples given below, but the present invention is not meant to be limited by these examples.

Example 1

The brazing sheets having the configurations shown in Tables 2 to 6 were manufactured using the alloy materials whose compositions are shown in Table 1. Then, each brazing sheet was coated with press oil, and after pressing it to each type, degreased and cleaned with an organic solvent and dried at room temperature. Tube portions of mini-core shapes shown in FIG. 1 were manufactured using the brazing sheets with the configurations shown in Table 2, Table 4, or Table 6. For the outer fin material, a 80 $\mu$m-thick fin material clad at a cladding ratio of 10% with JIS A 4045 on both sides of a JIS A 3003 core material was used. The outer fin material was coated with flux and dried. For the inner fin material, a 70 $\mu$m-thick JIS A 3003 fin material was used, to carry out brazing as described below.

Figure 7:
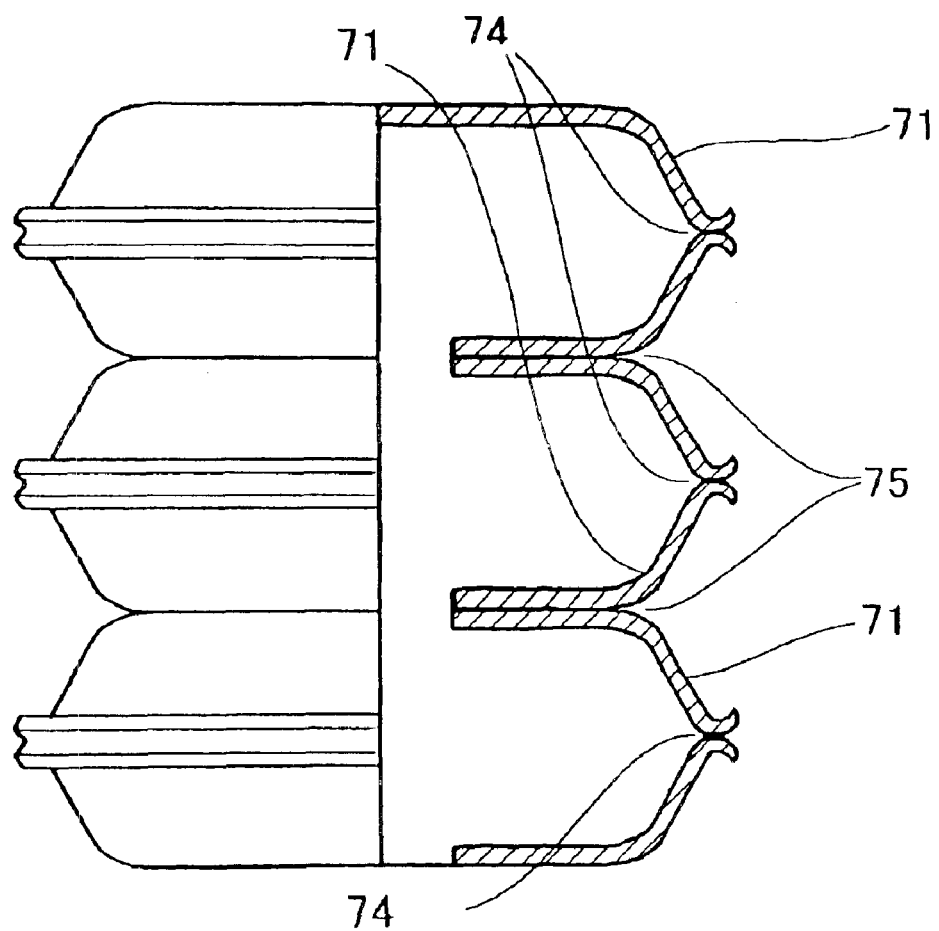
FIG. 7 is a partially sectional view showing an example of the basic structure of the assembly of a usual drawn cap type heat exchanger member manufactured by the present invention.

Further by the same method, a 3-stage drawn cap shown in FIG. 7 was manufactured using the brazing sheets with the configurations shown in Table 3 or Table 5. The thickness of 2 caps laid one on an open top of the other was 8 mm, and the diameter of the cap was 4 cm. FIG. 7 is a cross section of the drawn cap 71 with a part of the inside cut out. As shown in the figure, there were 10 mm$\phi$ holes in the centers of upper and lower sides of the drawn caps except the uppermost end, assembled one on top of another with the holes aligned. In the figure, reference number 74 is the inner joint of the drawn cap 71, and 75 is the joint portion between drawn caps. The flux was applied to the outer filler alloy surface of each sample of the drawn cap and dried to manufacture it.

TABLE 1

| Alloy symbol | Filler alloy composition (mass %) | | | | |
|---|---|---|---|---|---|
| | Si | Zn | Cu | Mg | Al |
| A | 11 | — | — | — | Balance |
| B | 11 | 2.5 | 1 | — | Balance |
| C | 11 | 0.5 | 1 | — | Balance |
| D | 11 | — | — | 0.29 | Balance |
| E | 11 | — | — | 0.17 | Balance |
| F | 11 | — | — | 0.09 | Balance |

| Alloy symbol | Core material alloy composition (mass %) | |
|---|---|---|
| | | Mg |
| G | JIS A 3003 | 0.88 |
| H | JIS A 3003 | 0.49 |
| I | JIS A 3003 | 0.30 |
| J | JIS A 3003 | 0.11 |
| K | JIS A 3003 | 0.01 |

| Alloy symbol | Sacrificial corrosion prevention layer (mass %) | | | | |
|---|---|---|---|---|---|
| | Zn | Mg | Al | — | — |
| L | 2 | — | Balance | — | — |
| M | 2 | 0.09 | Balance | — | — |

TABLE 2

| Brazing sheet configuration | | | |
|---|---|---|---|
| Inner filler alloy | | Core material | |
| Brazing sheet No. | Alloy symbol | Sheet thickness (μm) | Alloy symbol | Sheet thickness (μm) |

| Brazing sheet No. | Alloy symbol | Sheet thickness (μm) | Alloy symbol | Sheet thickness (μm) |
|---|---|---|---|---|
| 1 | A | 40 | J | 360 |
| 2 | B | 40 | J | 360 |
| 3 | C | 40 | J | 360 |
| 4 | E | 40 | I | 360 |
| 5 | D | 40 | K | 360 |

TABLE 3

| Brazing sheet configuration | | | | | |
|---|---|---|---|---|---|
| Inner filler alloy | | Core material | | Outer filler alloy | |
| Brazing sheet No. | Alloy symbol | Sheet thickness (μm) | Alloy symbol | Sheet thickness (μm) | Alloy symbol | Sheet thickness (μm) |

| Brazing sheet No. | Alloy symbol | Sheet thickness (μm) | Alloy symbol | Sheet thickness (μm) | Alloy symbol | Sheet thickness (μm) |
|---|---|---|---|---|---|---|
| 7 | B | 40 | J | 350 | A | 10 |
| 8 | B | 40 | I | 340 | B | 20 |
| 9 | C | 40 | H | 330 | B | 30 |
| 10 | E | 40 | H | 330 | A | 30 |
| 11 | F | 40 | I | 340 | A | 20 |
| 12 | C | 40 | G | 340 | C | 20 |
| 13 | D | 40 | K | 350 | A | 10 |
| 14 | D | 40 | K | 330 | B | 30 |
| 15 | D | 40 | K | 340 | C | 20 |

TABLE 4

| Brazing sheet configuration | | | | | |
|---|---|---|---|---|---|
| Inner filler alloy | | Core material | | Sacrificial corrosion prevention layer | |
| Brazing sheet No. | Alloy symbol | Sheet thickness (μm) | Alloy symbol | Sheet thickness (μm) | Alloy symbol | Sheet thickness (μm) |

| Brazing sheet No. | Alloy symbol | Sheet thickness (μm) | Alloy symbol | Sheet thickness (μm) | Alloy symbol | Sheet thickness (μm) |
|---|---|---|---|---|---|---|
| 16 | B | 40 | G | 320 | M | 40 |
| 17 | C | 40 | H | 320 | M | 40 |
| 18 | A | 40 | J | 330 | M | 30 |
| 19 | F | 40 | I | 330 | M | 30 |
| 20 | B | 40 | I | 320 | L | 40 |
| 21 | C | 40 | J | 320 | L | 40 |
| 22 | D | 40 | K | 320 | L | 40 |
| 23 | D | 40 | K | 340 | L | 20 |

TABLE 5

| Brazing sheet configuration | | | | | | | |
|---|---|---|---|---|---|---|---|
| Inner filler alloy | | Core material | | Diffusion prevention layer | | Outer filler alloy | |
| Brazing Sheet No. | Alloy symbol | Sheet thickness (μm) | Alloy symbol | Sheet thickness (μm) | Alloy symbol | Sheet thickness (μm) | Alloy symbol | Sheet thickness (μm) |

| Brazing Sheet No. | Alloy symbol | Sheet thickness (μm) | Alloy symbol | Sheet thickness (μm) | Alloy symbol | Sheet thickness (μm) | Alloy symbol | Sheet thickness (μm) |
|---|---|---|---|---|---|---|---|---|
| 24 | A | 40 | G | 30 | K | 290 | A | 40 |
| 25 | C | 40 | I | 30 | K | 310 | B | 20 |
| 26 | F | 40 | H | 30 | K | 310 | A | 20 |
| 27 | B | 40 | I | 30 | K | 300 | C | 30 |
| 28 | B | 40 | H | 30 | K | 290 | B | 40 |
| 29 | D | 40 | K | 30 | K | 290 | A | 40 |
| 30 | D | 40 | K | 30 | K | 310 | B | 20 |
| 31 | D | 40 | K | 30 | K | 300 | C | 30 |

TABLE 6

| | Brazing sheet configuration | | | | | | | |
|---|---|---|---|---|---|---|---|---|
| | Inner filler alloy | | | | | | Sacrificial corrosion prevention layer | |
| Brazing sheet No. | Alloy symbol | Sheet thickness (μm) | Alloy symbol | Sheet thickness (μm) | Alloy symbol | Sheet thickness (μm) | Alloy symbol | Sheet thickness (μm) |
| | | | Core material | | Diffusion prevention layer | | | |
| 32 | A | 40 | G | 30 | K | 310 | L | 20 |
| 33 | C | 40 | H | 30 | K | 310 | L | 20 |
| 34 | A | 40 | I | 30 | K | 310 | L | 20 |
| 35 | E | 40 | H | 30 | K | 310 | L | 20 |
| | | | Diffusion control layer | | Core material | | | |
| 36 | F | 40 | K | 10 | I | 110 | L | 30 |
| 37 | B | 40 | K | 80 | G | 50 | L | 30 |
| 38 | B | 40 | K | 80 | G | 50 | L | 30 |
| 39 | D | 40 | K | 30 | K | 310 | L | 20 |

Figure 8:
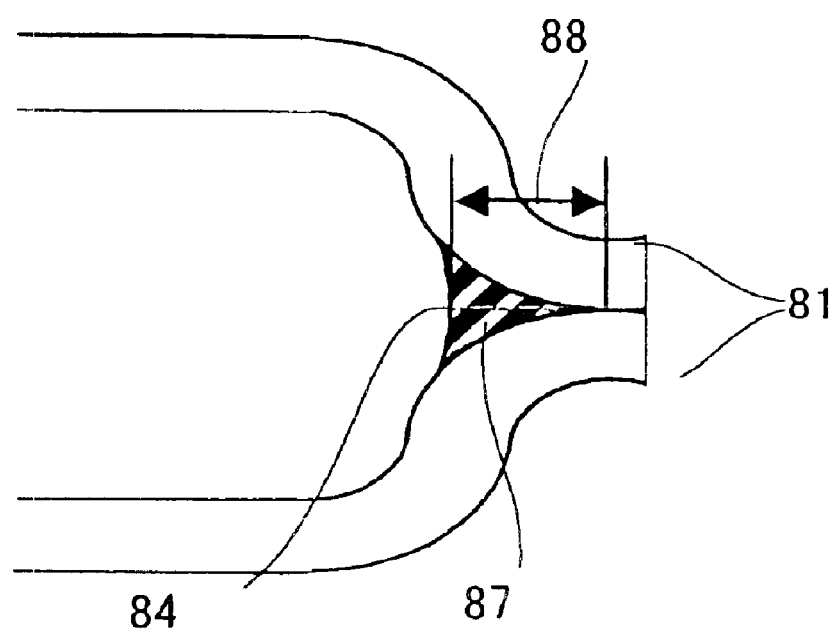
FIG. 8 shows an enlarged end view of the sectioned part of the joint portion of the mini-core tube material of FIG. 1.
Figure 9:
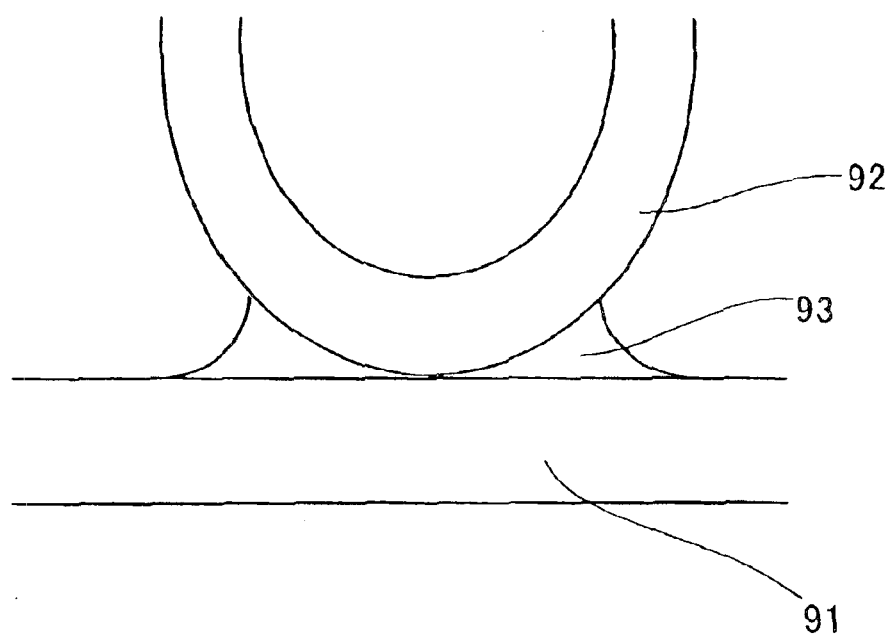
FIG. 9 shows an enlarged end view of the sectioned part of the joint portion of the mini-core tube material and an outer fin material.

As for the mini-cores, the inventors evaluated the brazing quality, by heating for 3 minutes at 600° C. under the brazing atmosphere in which the oxygen concentrations and dew points of the nitrogen atmosphere brazing furnace were adjusted as shown in Table 7. FIG. 8 shows an enlarged end view of the sectioned part of the joint portion of the mini-core tube material of FIG. 1. As for the evaluation of the brazing quality, the inventors measured the throat thickness (88) at the points of 1.0, 10.0 and 100.0 mm distances respectively from the opening of the tube of the joint portion (not shown) of the inner fin material (not shown) and the tube, with respect to the throat thickness 88 of the fillet 87 formed on the inside of the inner joint portion 84 of the tube material 81. FIG. 9 shows an enlarged end view of the sectioned part of the joint portion of the mini-core tube material of FIG. 1 and the outer fin material. As for the evaluation of the brazing quality of the outside, the inventors measured the size of the fillet 93 formed between the outer fin material 92 and the tube material 91. The inventors measured the fillet sizes, by taking photographs using optical microscope, after putting the fillet portion in resin and polishing. The measurement results are shown in Table 7.

TABLE 7

| | Atmosphere | | Distance from tube | Inner fillet | Outer |
|---|---|---|---|---|---|
| Brazing sheet No. | Oxygen concentration (ppm) | Dew point (° C.) | opening portion (mm) | throat thickness (mm) | fillet size (mm²) |
| 1 | 100 | −30 | 1.0 | 1.6 | 0.17 |
| | | | 10.0 | 1.8 | |
| | | | 100.0 | 1.8 | |
| 2 | 300 | −40 | 1.0 | 1.7 | 0.17 |
| | | | 10.0 | 1.6 | |
| | | | 100.0 | 1.8 | |
| 3 | 60 | −45 | 1.0 | 1.8 | 0.18 |
| | | | 10.0 | 1.8 | |
| | | | 100.0 | 1.7 | |
| 4 | 60 | −45 | 1.0 | 1.1 | 0.18 |
| | | | 10.0 | 1.2 | |
| | | | 100.0 | 1.6 | |
| 16 | 500 | −40 | 1.0 | 1.5 | 0.15 |
| | | | 10.0 | 1.6 | |
| | | | 100.0 | 1.7 | |
| 17 | 80 | −50 | 1.0 | 1.9 | 0.16 |
| | | | 10.0 | 1.9 | |
| | | | 100.0 | 1.9 | |
| 18 | 400 | −45 | 1.0 | 1.5 | 0.15 |
| | | | 10.0 | 1.5 | |
| | | | 100.0 | 1.6 | |
| 19 | 70 | −40 | 1.0 | 1.2 | 0.19 |
| | | | 10.0 | 1.2 | |
| | | | 100.0 | 1.6 | |
| 20 | 70 | −40 | 1.0 | 1.9 | 0.14 |
| | | | 10.0 | 1.8 | |
| | | | 100.0 | 1.9 | |
| 21 | 70 | −40 | 1.0 | 1.8 | 0.13 |
| | | | 10.0 | 1.8 | |
| | | | 100.0 | 1.9 | |
| 32 | 500 | −45 | 1.0 | 1.5 | 0.15 |
| | | | 10.0 | 1.5 | |
| | | | 100.0 | 1.7 | |
| 33 | 500 | −45 | 1.0 | 1.8 | 0.16 |
| | | | 10.0 | 1.7 | |
| | | | 100.0 | 1.8 | |
| 34 | 100 | −45 | 1.0 | 1.8 | 0.19 |
| | | | 10.0 | 1.8 | |
| | | | 100.0 | 1.8 | |
| 35 | 500 | −45 | 1.0 | 1.1 | 0.16 |
| | | | 10.0 | 1.1 | |
| | | | 100.0 | 1.4 | |
| 36 | 50 | −40 | 1.0 | 1.3 | 0.15 |
| | | | 10.0 | 1.2 | |
| | | | 100.0 | 1.5 | |
| 37 | 50 | −40 | 1.0 | 1.7 | 0.14 |
| | | | 10.0 | 1.9 | |
| | | | 100.0 | 1.9 | |
| 38 | 50 | −40 | 1.0 | 1.6 | 0.13 |
| | | | 10.0 | 1.9 | |
| | | | 100.0 | 1.8 | |
| 5 | 300 | −40 | 1.0 | 0.5 | 0.17 |
| | | | 10.0 | 0.5 | |
| | | | 100.0 | 1.0 | |
| 22 | 400 | −40 | 1.0 | 0.3 | 0.15 |
| | | | 10.0 | 0.4 | |
| | | | 100.0 | 0.4 | |

TABLE 7-continued

| Brazing sheet No. | Atmosphere | | Distance from tube opening portion (mm) | Inner fillet throat thickness (mm) | Outer fillet size (mm²) |
|---|---|---|---|---|---|
| | Oxygen concentration (ppm) | Dew point (° C.) | | | |
| 23 | 50 | −40 | 1.0 | 0.6 | 0.14 |
| | | | 10.0 | 0.6 | |
| | | | 100.0 | 1.2 | |
| 39 | 500 | −40 | 1.0 | 0.1 | 0.15 |
| | | | 10.0 | 0.2 | |
| | | | 100.0 | 0.2 | |

Figure 10:
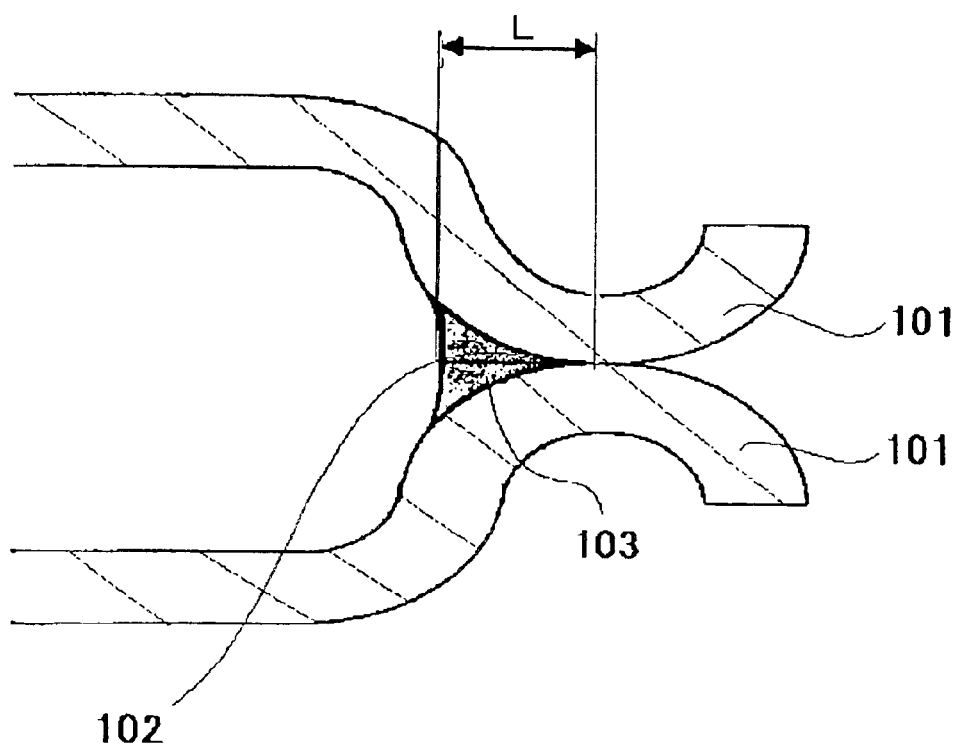
FIG. 10 shows an enlarged end view of the sectioned part of the inner joint portion of the drawn cap of FIG. 7.
Figure 11:
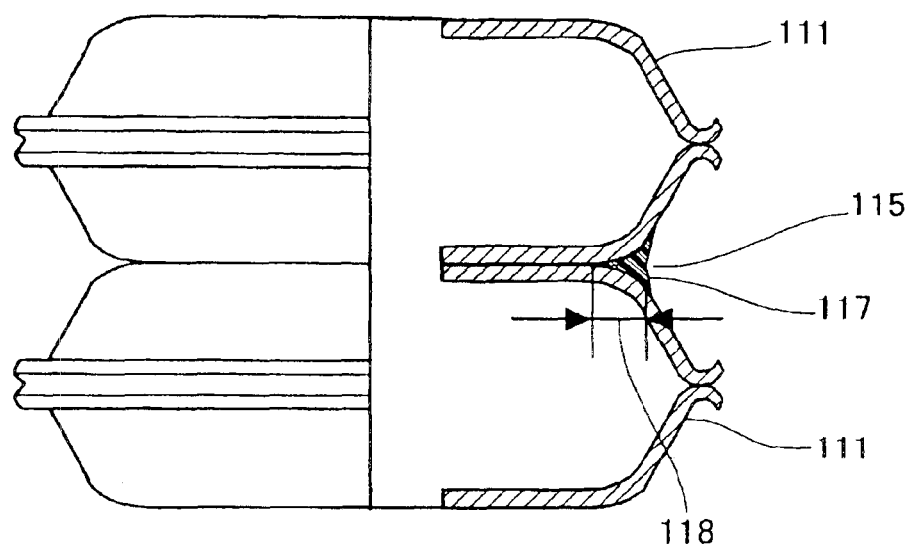
FIG. 11 shows a partial cross section of the drawn cap type heat exchanger member.

As for the drawn caps, the inventors evaluated the brazing quality, by heating 3 minutes at 600° C. under the brazing atmosphere in which the oxygen concentrations and dew points of the nitrogen atmosphere brazing furnace were adjusted as shown in Table 8. To evaluate the brazing quality, the inventors measured the throat thickness L (See FIG. 10) of the fillet 103 formed on the inside of the inner joint portion 102 of the drawn cap material of each stage. FIG. 11 shows a partial cross section of the heat exchanger member of a drawn cap type manufactured. As for the brazing of the outside, the inventors measured the throat thickness 118 of the fillet 117 formed at the joint portion 115 between the assembled drawn caps 111. The measurement results are shown in Table 8.

TABLE 8

| Brazing sheet No. | Atmosphere | | | Throat thickness of inner fillet (mm) | Throat thickness of outer fillet (mm) |
|---|---|---|---|---|---|
| | Oxygen concentration (ppm) | Dew point (° C.) | Number of stages of drawn cap | | |
| 7 | 100 | −30 | Uppermost stage | 1.8 | 1.1 |
| | | | 2nd stage | 1.8 | |
| | | | Lowermost stage | 1.8 | |
| 8 | 50 | −40 | Uppermost stage | 1.9 | 1.1 |
| | | | 2nd stage | 1.8 | |
| | | | Lowermost stage | 1.7 | |
| 9 | 60 | −45 | Uppermost stage | 1.9 | 1.7 |
| | | | 2nd stage | 1.9 | |
| | | | Lowermost stage | 1.7 | |
| 10 | 60 | −45 | Uppermost stage | 1.5 | 1.7 |
| | | | 2nd stage | 1.3 | |
| | | | Lowermost stage | 1.2 | |
| 11 | 50 | −40 | Uppermost stage | 1.5 | 1.1 |
| | | | 2nd stage | 1.4 | |
| | | | Lowermost stage | 1.2 | |
| 12 | 500 | −45 | Uppermost stage | 1.8 | 0.8 |
| | | | 2nd stage | 1.9 | |
| | | | Lowermost stage | 1.8 | |
| 24 | 50 | −40 | Uppermost stage | 1.6 | 1.7 |
| | | | 2nd stage | 1.7 | |
| | | | Lowermost stage | 1.5 | |
| 25 | 500 | −40 | Uppermost stage | 1.8 | 0.8 |
| | | | 2nd stage | 1.8 | |
| | | | Lowermost stage | 1.7 | |
| 26 | 500 | −40 | Uppermost stage | 1.4 | 1.1 |
| | | | 2nd stage | 1.4 | |
| | | | Lowermost stage | 1.2 | |
| 27 | 300 | −30 | Uppermost stage | 1.9 | 1.4 |
| | | | 2nd stage | 1.9 | |
| | | | Lowermost stage | 1.9 | |
| 28 | 500 | −40 | Uppermost stage | 1.7 | 1.1 |
| | | | 2nd stage | 1.7 | |
| | | | Lowermost stage | 1.6 | |
| 13 | 100 | −30 | Uppermost stage | 1.0 | 1.4 |
| | | | 2nd stage | 0.7 | |
| | | | Lowermost stage | 0.6 | |
| 14 | 60 | −45 | Uppermost stage | 0.9 | 1.9 |
| | | | 2nd stage | 0.7 | |
| | | | Lowermost stage | 0.5 | |
| 15 | 400 | −40 | Uppermost stage | 1.1 | 1.6 |
| | | | 2nd stage | 0.9 | |
| | | | Lowermost stage | 0.4 | |
| 29 | 50 | −40 | Uppermost stage | 1.2 | 1.7 |
| | | | 2nd stage | 0.9 | |
| | | | Lowermost stage | 0.6 | |
| 30 | 500 | −40 | Uppermost stage | 0.3 | 1.0 |
| | | | 2nd stage | 0.2 | |
| | | | Lowermost stage | 0.2 | |
| 31 | 300 | −30 | Uppermost stage | 0.4 | 1.4 |
| | | | 2nd stage | 0.4 | |
| | | | Lowermost stage | 0.3 | |

As can be seen clearly from Tables 7 and 8, in the examples according to the present invention, the brazing quality is stable and satisfactory even when the throat thickness of the inner fillet was thick, and especially when the oxygen concentration was high, and even in the portion where the distance from the tube opening was short and it might be apt to be affected by the furnace atmosphere.

Example 2

Various brazing sheets having the configurations shown in Tables 10 and 11 were manufactured with the structural materials shown in Table 9. In the manufacture of the brazing sheets, after homogeneous heating treatments to the core materials at 600° C., both sides of the core materials were scalped to a predetermined thickness before using. Further after homogeneous heating treatments to the filler alloys at 500° C., hot-rolling process of the filler alloys was carried out to a predetermined thickness before using. After rolling both the core material and the filler alloy together to combine them at 500° C., cold-rolling was carried out to a predetermined thickness.

TABLE 9

| Alloy symbol | Filler alloy composition (mass %) | | | | |
|---|---|---|---|---|---|
| | Si | Mg | Zn | Cu | Al |
| AA | 11 | 0.02 | — | — | Balance |
| BB | 11 | 0.09 | — | — | Balance |
| CC | 11 | 0.17 | — | — | Balance |
| DD | 11 | 0.29 | — | — | Balance |
| EE | 11 | 0.06 | — | — | Balance |
| FF | 11 | 0.04 | — | — | Balance |
| GG | 11 | 0.01 | 2.5 | 1 | Balance |

| Alloy symbol | Core material alloy composition (mass %) | |
|---|---|---|
| | JIS A 3003 | Mg |
| HH | 100 | — |
| II | 99.97 | 0.03 |
| JJ | 99.95 | 0.05 |
| KK | 99.79 | 0.21 |
| LL | 99.71 | 0.29 |
| MM | 99.61 | 0.39 |
| NN | 99.51 | 0.49 |
| OO | 99.42 | 0.58 |
| PP | 99.3 | 0.70 |
| QQ | 99.21 | 0.79 |
| RR | 99.1 | 0.90 |
| SS | 99.01 | 0.99 |
| TT | 98.91 | 1.09 |
| UU | 98.78 | 1.22 |

TABLE 10

| Brazing sheet No. | Configuration of brazing sheet | | | |
|---|---|---|---|---|
| | Inner filler alloy | | Core material | |
| | Alloy symbol | Sheet thickness (μm) | Alloy symbol | Sheet thickness (μm) |
| 101 | AA | 5 | JJ | 195 |
| 102 | AA | 5 | KK | 195 |
| 103 | BB | 5 | LL | 195 |
| 104 | AA | 5 | NN | 195 |
| 105 | AA | 10 | JJ | 190 |
| 106 | AA | 10 | KK | 190 |
| 107 | AA | 10 | MM | 190 |
| 108 | BB | 10 | NN | 190 |
| 109 | AA | 20 | JJ | 180 |
| 110 | AA | 20 | KK | 180 |
| 111 | AA | 20 | MM | 180 |
| 112 | BB | 20 | NN | 180 |
| 113 | CC | 20 | OO | 180 |
| 114 | AA | 30 | JJ | 170 |
| 115 | AA | 30 | KK | 170 |
| 116 | GG | 30 | LL | 170 |
| 117 | AA | 30 | MM | 170 |
| 118 | BB | 30 | NN | 170 |
| 119 | CC | 30 | OO | 170 |
| 120 | CC | 30 | QQ | 170 |
| 121 | AA | 40 | JJ | 360 |
| 122 | AA | 40 | KK | 360 |
| 123 | GG | 40 | LL | 360 |
| 124 | AA | 40 | MM | 360 |
| 125 | BB | 40 | NN | 360 |
| 126 | CC | 40 | OO | 360 |
| 127 | AA | 40 | RR | 360 |
| 128 | AA | 40 | SS | 360 |
| 129 | AA | 50 | JJ | 350 |
| 130 | AA | 50 | KK | 350 |
| 131 | BB | 50 | LL | 350 |
| 132 | BB | 50 | NN | 350 |
| 133 | AA | 50 | PP | 350 |
| 134 | AA | 50 | QQ | 350 |
| 135 | AA | 50 | TT | 350 |
| 136 | AA | 60 | JJ | 340 |
| 137 | AA | 60 | KK | 340 |
| 138 | AA | 60 | MM | 340 |
| 139 | GG | 60 | NN | 340 |
| 140 | BB | 60 | NN | 340 |
| 141 | BB | 60 | RR | 340 |
| 142 | AA | 5 | OO | 195 |
| 143 | AA | 5 | SS | 195 |
| 144 | AA | 5 | TT | 195 |
| 145 | AA | 10 | PP | 190 |
| 146 | BB | 10 | PP | 190 |
| 147 | AA | 10 | UU | 190 |
| 148 | BB | 20 | QQ | 180 |
| 149 | BB | 20 | RR | 180 |
| 150 | CC | 30 | RR | 170 |
| 151 | AA | 30 | UU | 170 |
| 152 | BB | 10 | HH | 190 |
| 153 | CC | 30 | II | 170 |
| 154 | DD | 30 | KK | 170 |
| 155 | CC | 40 | JJ | 360 |

TABLE 11

| Brazing sheet No. | Configuration of brazing sheet | | | |
|---|---|---|---|---|
| | Inner filler alloy | | Core material | |
| | Alloy symbol | Sheet thickness (μm) | Alloy symbol | Sheet thickness (μm) |
| 156 | FF | 5 | LL | 195 |
| 157 | AA | 5 | LL | 195 |
| 158 | EE | 5 | LL | 195 |
| 159 | EE | 5 | KK | 195 |
| 160 | AA | 10 | KK | 190 |
| 161 | EE | 10 | LL | 190 |
| 162 | FF | 10 | LL | 190 |
| 163 | BB | 10 | MM | 190 |
| 164 | BB | 20 | MM | 180 |
| 165 | GG | 20 | MM | 180 |

TABLE 11-continued

| Brazing sheet No. | Configuration of brazing sheet | | | |
|---|---|---|---|---|
| | Inner filler alloy | | Core material | |
| | Alloy symbol | Sheet thickness ($\mu$m) | Alloy symbol | Sheet thickness ($\mu$m) |
| 166 | AA | 25 | LL | 180 |
| 167 | FF | 25 | LL | 180 |
| 168 | BB | 25 | MM | 180 |
| 169 | EE | 30 | NN | 170 |
| 170 | EE | 30 | MM | 170 |
| 171 | FF | 30 | OO | 170 |
| 172 | FF | 40 | LL | 170 |
| 173 | AA | 40 | NN | 170 |
| 174 | FF | 40 | KK | 170 |
| 175 | EE | 50 | LL | 170 |
| 176 | BB | 50 | LL | 360 |

Final annealing was carried out to the manufactured brazing sheets at 380° C. to make them into O materials. Then, these brazing sheets were coated with lubricating oil and rolled to form into each type, degreased and cleaned with an organic solvent, dried at ordinary temperature, and assembled into the assembled conditions (mini-cores) of the heat exchanger tube member with the total length of 50 cm, as shown in FIG. 1. The 70 $\mu$m-thick JIS A 3003 alloy was used for the inner fin material 13. As for the brazing sheets Nos. 101 to 155 with the configurations of Table 10, the inventors evaluated the brazing quality, after heating for 3 minutes at 600° C. in a nitrogen gas atmosphere (oxygen concentration 100 ppm, dew point –40° C.). For the brazing sheets (Nos. 156 to 176) with the configuration shown in Table 11, braze heating test was conducted for 3 minutes at 600° C. under severer conditions of oxygen concentration 400 ppm and dew point –20° C. (in a nitrogen gas atmosphere). To evaluate the brazing quality, the inventors measured the throat thickness 88 (See FIG. 8) of the fillet 87 formed on the inside of the inner joint portion 14 located at a distance of 5 cm from the opening of the tube material 11 of FIG. 1. FIG. 8 shows an enlarged cross sectional view of the condition in which the fillet 87 is formed in the joint portion 14 (84) of the tube material 11 (81) of the mini-core shown in FIG. 1. Here, the length shown as 88 in FIG. 8 is the inner throat thickness. The results are shown in Tables 12 and 13. As for the evaluation of the inner throat thickness, when the throat thickness is 0.5 mm or more, it is judged that a sufficient fillet is formed; when it is 0.7 mm or more, it is judged that a good fillet is formed. These cases are evaluated to be sufficient brazing quality as the products of the present invention. When the throat thickness is less than 0.5 mm, it is judged to be defective. Further as for the existence of erosion and the existence of breaks in brazing portions, they are shown in Table 12 likewise. The inventors examined the erosion in terms of occurrence of corrosion in the core material by observing the structure of the cross section of the tube joint portion 15 after brazing. Further as for the break in brazing, the inventors examined with the naked eye the state of brazing at the tube joint portion 15 after brazing, and measured the ratio of the break in brazing to the total length at a tube joint portion where the break in brazing occurred.

TABLE 12

| Brazing sheet No. | Inner throat thickness (mm) | Occurrence of erosion | Break in brazing portion |
|---|---|---|---|
| 101 | 0.7 | None | None |
| 102 | 0.9 | None | None |
| 103 | 0.7 | None | None |
| 104 | 0.9 | None | None |
| 105 | 1.0 | None | None |
| 106 | 1.2 | None | None |
| 107 | 1.4 | None | None |
| 108 | 1.1 | None | None |
| 109 | 1.4 | None | None |
| 110 | 1.6 | None | None |
| 111 | 1.7 | None | None |
| 112 | 1.4 | None | None |
| 113 | 1.3 | None | None |
| 114 | 1.5 | None | None |
| 115 | 2.0 | None | None |
| 116 | 1.9 | None | None |
| 117 | 1.9 | None | None |
| 118 | 1.7 | None | None |
| 119 | 1.8 | None | None |
| 120 | 1.5 | None | None |
| 121 | 1.9 | None | None |
| 122 | 2.3 | None | None |
| 123 | 2.4 | None | None |
| 124 | 2.4 | None | None |
| 125 | 2.0 | None | None |
| 126 | 2.0 | None | None |
| 127 | 1.6 | Erosion occurred | None |
| 128 | 1.5 | Erosion occurred | None |
| 129 | 2.2 | None | None |
| 130 | 2.6 | None | None |
| 131 | 2.3 | None | None |
| 132 | 2.1 | None | None |
| 133 | 1.8 | Erosion occurred | None |
| 134 | 1.8 | Erosion occurred | None |
| 135 | 1.3 | Erosion occurred | None |
| 136 | 2.0 | None | None |
| 137 | 2.5 | None | None |
| 138 | 2.5 | None | None |
| 139 | 2.5 | None | None |
| 140 | 1.9 | Erosion occurred | None |
| 141 | 1.7 | Erosion occurred | None |
| 142 | 0.1 | None | 15% of total length |
| 143 | 0.2 | None | 40% of total length |
| 144 | 0.2 | None | 70% of total length |
| 145 | 0.1 | None | 15% of total length |
| 146 | 0.2 | None | 40% of total length |
| 147 | 0 | None | —* |
| 148 | 0.2 | None | 40% of total length |
| 149 | 0.1 | None | 40% of total length |
| 150 | 0 | None | — |
| 151 | 0 | None | — |
| 152 | 0.1 | None | None |
| 153 | 0.1 | None | None |
| 154 | 0.2 | None | None |
| 155 | 0.1 | None | None |

(Note)
*— Not tested

TABLE 13

| Brazing sheet No. | Inner throat thickness (mm) |
|---|---|
| 156 | 1.0 |
| 157 | 0.9 |
| 158 | 0.6 |
| 159 | 0.5 |
| 160 | 1.2 |
| 161 | 0.6 |
| 162 | 1.1 |
| 163 | 0.5 |

TABLE 13-continued

| Brazing sheet No. | Inner throat thickness (mm) |
|---|---|
| 164 | 0.6 |
| 165 | 1.2 |
| 166 | 1.3 |
| 167 | 1.2 |
| 168 | 0.6 |
| 169 | 1.5 |
| 170 | 2.0 |
| 171 | 1.9 |
| 172 | 1.9 |
| 173 | 1.7 |
| 174 | 1.8 |
| 175 | 1.5 |
| 176 | 1.9 |

Figure 12:
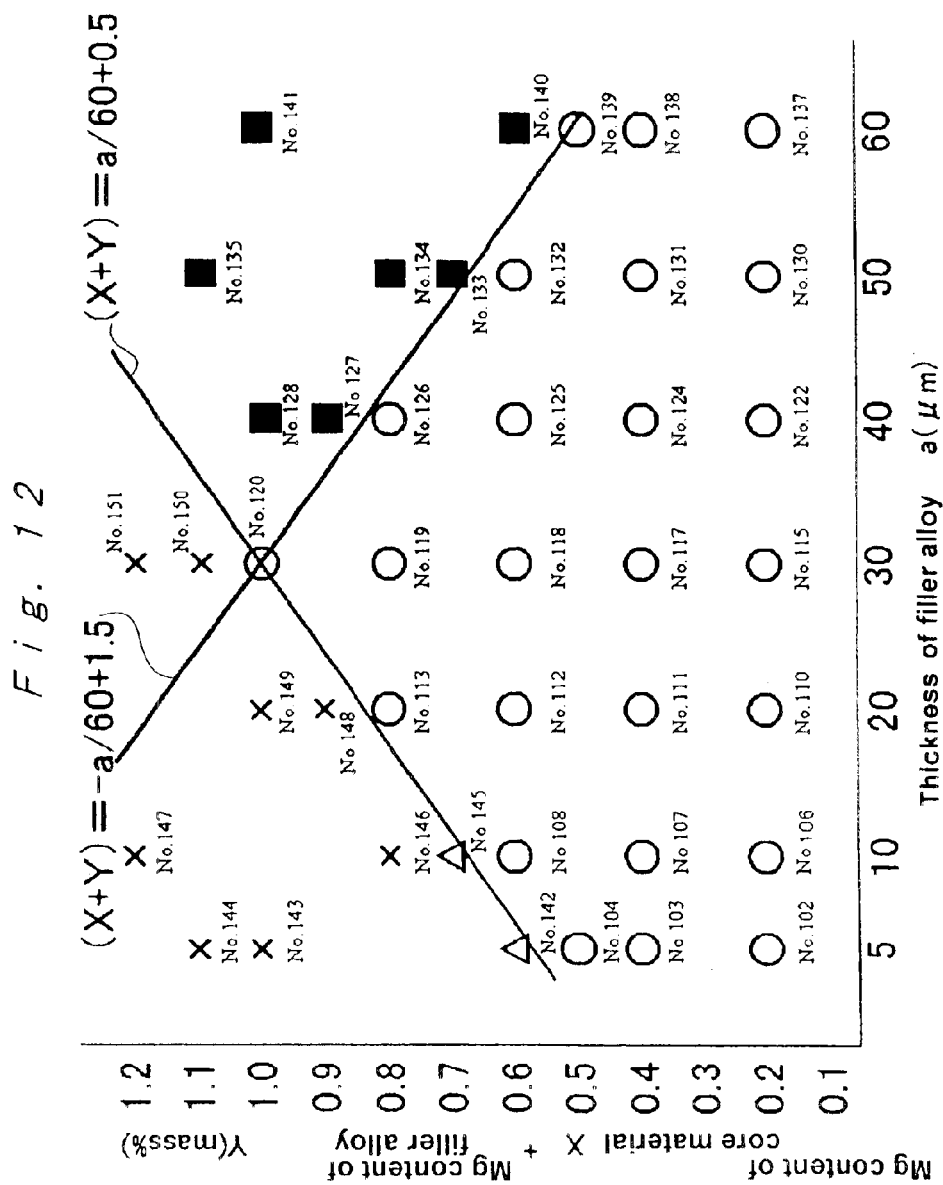
FIG. 12 is a diagram showing the relation between the total of {(Mg content of core material)+(Mg content of filler alloy)} and the thickness of filler alloy in an example.

Some of the results of brazing sheets Nos. 101 to 155 are shown by graph in FIG. 12. The brazing sheet numbers are marked in the figure. "○" refers to those in which good fillets were formed without the occurrence of breaks in brazing, "Δ" refers to those in which fillets were formed but breaks in brazing occurred 20% or less of the total length, and "X" refers to those in which breaks in brazing occurred 20% or more of the total length or brazing was impossible. Further "▭" refers to those in which, based on the boundary between the core material and the filler alloy before braze heating, the core material was eroded by molten filler over the distance of 20 µm or more from the boundary, which is judged to be that erosion occurred.

As can be seen clearly from FIG. 12, in the inner brazing of the brazing sheet that does not satisfy $(X+Y) \leq a/60+0.5$, brazing was impossible, or the brazing quality was markedly lowered. Further in the brazing sheets of No. 127, No. 128, No. 133, No. 134, No. 135, No. 140 and No. 141, satisfying $(X+Y) \leq a/60+0.5$, fillets that are sufficiently good enough to braze were formed, but were out of the range of $(X+Y) \leq -a/60+1.5$, and in some of the brazing sheets, occurrence of erosion was observed.

As is clear from the results of Table 13, in the brazing sheets of Nos. 156–168 in which the thickness of the filler alloy was 25 µm or less, good fillets were formed in those for which the Mg content of the filler alloy was 0.05% by mass or less. In those for which the Mg content of the filler alloy exceeded 0.05% by mass but the thickness of the filler alloy exceeded 25 µm, it was confirmed that good fillets were formed.

As far as in a conventional braze heating atmosphere (oxygen concentration 100 ppm, dew point −40° C.), when the Mg content of the filler alloy exceeded 0.05% by mass or even with the thickness of the filler alloy being 25 µm or less, it is apparent from Table 12 that a good fillet formation could be obtained.

Example 3

Brazing sheets were manufactured with the composition of materials, as shown in Table 14, in the 4-layer structure of the outer filler alloy, the diffusion prevention layer, the core material, and the inner filler alloy, as shown in FIG. 5. The composition of each layer of Table 14 is shown in % by mass. The diffusion prevention layer was 0.26 mm thick. To the sheet thickness of the brazing sheet was 0.4 mm, the clad ratio of the outer filler alloy was 10% and the clad ratio of the inner filler alloy was 10%. The thickness of the core material was 0.06 mm. The manufacturing process included casting each alloy of the diffusion prevention layer, homogeneous treatment at the temperature of 580° C., and scalping both sides thereof 10 mm respectively. As for the core material, the alloys were cast, homogeneous treatment at the temperature of 580° C. was carried out, and scalped and hot-rolled to a predetermined thickness. For the outer filler alloys and inner filler alloys, the alloys were cast, homogeneous treatment at the temperature of 500° C. was carried out, and scalped and hot-rolled them to a predetermined thickness. Then, the alloy sheets were laid one on top of another in the sequence of the outer filler alloy, the diffusion prevention layer, the core material, and the inner filler alloy, and hot-rolling was carried out to combine these together at a temperature of 500° C., to make a brazing sheet of 3 mm thickness. Further, after cold rolling, the final annealing was carried out at a temperature of 380° C. to make a brazing sheet of O material with sheet thickness of 0.4 mm.

After conducting a bending process of the thus-obtained brazing sheet with the inner filler alloy made as inner, the 100 mm-long tube material 11 was formed as shown in FIG. 1. Further corrugate process of the JIS A 3003 alloy with sheet thickness of 0.1 mm was carried out, making the outer fin material 12 and the inner fin material 13, respectively. Further by assembling two tube materials 11 and two inner fin materials 13 and one outer fin material 12, a core sample simulating a heat exchanger core was manufactured.

In the above core sample, the outside of the core was coated with a flux for NB method. At this time, the inventors took caution for the flux not to go into the inside of the tube. After coating with flux, heating and brazing were carried out under the conditions of 600° C. and 3 minutes in a brazing furnace with a nitrogen atmosphere. The oxygen concentration in the brazing furnace at this time was made to 80 ppm. The inventors examined the core after brazing with the naked eye for the tube joint portion 14 and the joint portion 15 of the tube and the inner fin, to evaluate the state of brazing.

TABLE 14

| No. | Outer filler alloy | Diffusion prevention layer | Core material | | | | | | Inner filler alloy | | | | |
|---|---|---|---|---|---|---|---|---|---|---|---|---|---|
| | | | Si | Fe | Cu | Mn | Mg | Al | Si | Cu | Zn | Mg | Al |
| 201 | 4045 Alloy | 3003 Alloy | 0.43 | 0.25 | 0.13 | 1.0 | 0.22 | Balance | 4045 Alloy | | | | |
| 202 | " | " | 0.22 | 0.10 | 0.17 | 0.08 | 0.30 | Balance | 4045 Alloy | | | | |
| 203 | " | " | 1.15 | 0.65 | 0.15 | 1.0 | 0.76 | Balance | 4045 Alloy | | | | |
| 204 | " | " | 0.80 | 1.92 | 0.16 | 1.1 | 0.42 | Balance | 4045 Alloy | | | | |
| 205 | " | " | 0.52 | 0.31 | 0.48 | 1.0 | 0.65 | Balance | 4045 Alloy | | | | |
| 206 | " | " | 0.48 | 0.34 | 0.75 | 1.9 | 0.51 | Balance | 4045 Alloy | | | | |
| 207 | " | " | 0.38 | 0.30 | 1.15 | 1.2 | 0.38 | Balance | 4045 Alloy | | | | |
| 208 | " | " | 0.43 | 0.28 | 0.52 | 1.0 | 0.93 | Balance | 4045 Alloy | | | | |
| 209 | " | " | 0.38 | 0.32 | 0.51 | 1.0 | 1.43 | Balance | 4045 Alloy | | | | |
| 210 | " | 3003Alloy + 0.12Mg | 0.42 | 0.34 | 0.45 | 1.0 | 0.48 | Balance | 4045 Alloy | | | | |

TABLE 14-continued

| No. | Outer filler alloy | Diffusion prevention layer | Core material | | | | | | Inner filler alloy | | | | |
|---|---|---|---|---|---|---|---|---|---|---|---|---|---|
| | | | Si | Fe | Cu | Mn | Mg | Al | Si | Cu | Zn | Mg | Al |
| 211 | " | 3003Alloy + 0.24Mg | 0.39 | 0.27 | 0.47 | 1.1 | 0.38 | Balance | | 4045 Alloy | | | |
| 212 | " | 3003Alloy + 0.32Mg | 0.36 | 0.29 | 0.45 | 1.1 | 0.43 | Balance | | 4045 Alloy | | | |
| 213 | " | 3003Alloy | 0.47 | 0.28 | 0.46 | 1.0 | 0.80 | Balance | 7.3 | 0.5 | 1.6 | — | Balance |
| 214 | " | " | 0.39 | 0.24 | 0.52 | 1.1 | 0.63 | Balance | 10.8 | 0.9 | 2.4 | — | Balance |
| 215 | " | " | 0.39 | 0.25 | 0.46 | 1.0 | 0.50 | Balance | 11.6 | 1.6 | 2.8 | — | Balance |
| 216 | 4045 Alloy | 3003 Alloy | 0.37 | 0.26 | 0.47 | 1.0 | 0.45 | Balance | 11.2 | 7.6 | 5.6 | — | Balance |
| 217 | " | " | 0.38 | 0.32 | 0.48 | 1.1 | 0.52 | Balance | 11.0 | 1.3 | 2.6 | 0.14 | Balance |
| 218 | " | 3003Alloy + 0.22Mg | 0.39 | 0.24 | 0.52 | 1.1 | 0.63 | Balance | 10.8 | 0.9 | 2.4 | — | Balance |
| 219 | " | 3003Alloy + 0.34Mg | 0.39 | 0.25 | 0.46 | 1.0 | 0.50 | Balance | 11.6 | 1.6 | 2.8 | — | Balance |
| 220 | " | 3003Alloy | 0.12 | 0.14 | 0.54 | 1.0 | — | Balance | | 4045Alloy | | | |
| 221 | " | " | 0.34 | 0.26 | 0.08 | 0.9 | 0.08 | Balance | 10.2 | — | — | 0.35 | Balance |
| 222 | " | " | 0.39 | 0.33 | 0.48 | 1.0 | 0.14 | Balance | 9.4 | — | — | 1.82 | Balance |
| 223 | " | " | 0.28 | 0.25 | 0.38 | 1.1 | 0.06 | Balance | 10.4 | 0.8 | 2.8 | 0.84 | Balance |
| 224 | " | " | 0.42 | 0.28 | 0.16 | 1.1 | 1.63 | Balance | | 4045Alloy | | | |
| 225 | " | None | | | 3003Alloy | | | | | 4045Alloy | | | |
| 226 | " | None | | | 3003Alloy | | | | 10.2 | — | — | 0.35 | Balance |
| 227 | " | None | | | 3003Alloy | | | | 9.4 | — | — | 1.82 | Balance |

Further, as a conventional example, brazing sheets were manufactured by using a core material not containing Mg, with 3 layers composed of the same outer filler alloy, the above core material, the same inner filler alloy, with the compositions as shown in Table 14, in the same manner as above. Further, the core samples were manufactured using the thus-obtained brazing sheets, brazed, and tested on the state of brazing, in the same manner as above. Meanwhile, in this case, the thickness of the core material was 0.32 mm. Table 15 shows the results of evaluating the brazing quality.

TABLE 15

| No. | State of brazing at tube joint portion | State of brazing between tube and inner fin |
|---|---|---|
| 201 | Δ | ○ |
| 202 | Δ | ○ |
| 203 | Δ | ○ |
| 204 | Δ | ○ |
| 205 | Δ | ○ |
| 206 | Δ | ○ |
| 207 | Δ | ○ |
| 208 | Δ | ○ |
| 209 | Δ | ○ |
| 210 | Δ | ○ |
| 211 | Δ | ○ |
| 212 | Δ | ○ |
| 213 | ○ | ○ |
| 214 | ○ | ○ |
| 215 | ○ | ○ |
| 216 | ○ | ○ |
| 217 | ○ | ○ |
| 218 | Δ | ○ |
| 219 | Δ | ○ |
| 220 | X | X |
| 221 | X | Δ |
| 222 | X | Δ |
| 223 | X | ○ |
| 224 | Cracks occurred during hot rolling | |
| 225 | X | X |
| 226 | X | Δ |
| 227 | X | Δ |

(Note)
Evaluation standard by the naked eye:
"X": There were breaks in brazing portions that were not joined.
"Δ": There were no portions that were not joined but fillets were small.
"○": There were no portions that were not joined and fillets were big.

As is clear from Table 15, the test example Nos. 201 to 219 were of good brazing quality, without the occurrence of breaks in brazing in any place of the tube joint portion 14 and the joint portion 15 of the tube and the inner fin. In contrast to this, in the test example Nos. 220 to 224, because the Mg contents of the core material were too little or the Mg contents of the filler alloy were too much, breaks in brazing occurred in part of the tube joint, so satisfactory brazing quality could not be obtained. Further in the test example No. 224, the Mg content of the core material was excessive, and cracks occurred in the material in the hot rolling process, so the inventors could not supply it for brazing quality test. Also in Nos. 225 to 227, in which the core materials not containing Mg were used, breaks in brazing occurred in the tube joint portions, so satisfactory brazing quality could not be obtained.

INDUSTRIAL APPLICABILITY

The method of the present invention of brazing aluminum or aluminum alloy materials is preferable as a method of manufacturing aluminum alloy heat exchangers efficiently and industrially.

Also, the aluminum alloy brazing sheet of the present invention is preferable as a brazing sheet for manufacturing aluminum alloy heat exchangers efficiently and industrially.

Furthermore, the aluminum alloy brazing sheet of the present invention is preferable for automotive heat exchanger members or parts, for example, tube materials of evaporator, condenser, oil cooler, and the like, and inner fin materials thereof.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method of brazing aluminum or aluminum alloy materials, which comprises:
    keeping one side of a clad surface of a filler alloy of an aluminum alloy brazing sheet inside a brazing assembly;
    forming the brazing sheet to constitute a hollow structure; and carrying out brazing on the inside of the formed hollow structure without applying flux in an inert gas atmosphere, wherein said sheet has an aluminum or aluminum alloy core clad with a filler alloy layer composed of an Al—Si-based alloy on one side or both sides thereof, and contains Mg at least in a layer constituting the brazing sheet other than the filler alloy layer.

2. The method of brazing aluminum or aluminum alloy materials according to claim 1, which further comprises: brazing in an inert gas atmosphere by using flux, in an opening portion other than the inside of the hollow structure.

3. An aluminum alloy brazing sheet, which is suitable to the brazing method according to claim 1, wherein one side or both sides of the aluminum or aluminum alloy core material is clad with the Al—Si-based filler alloy, and a cladding thickness a ($\mu$m) of the filler alloy applied on the inside of the hollow structure, a Mg content X (mass %) of the core material, and a Mg content Y (mass %) of the filler alloy satisfy relationships of $(X+Y) \leq a/60+0.5$ and $X>Y$.

4. The aluminum alloy brazing sheet according to claims 3, wherein said sheet is a brazing sheet for use in a heat exchanger.

5. The aluminum alloy brazing sheet according to claim 3, wherein the Mg content of the filler alloy applied on the inside of the hollow structure is less than 0.2% by mass, and the Mg content of the core material is 0.05 to 1.0% by mass.

6. The aluminum alloy brazing sheet according to claims 5, wherein said sheet is a brazing sheet for use in a heat exchanger.

7. The aluminum alloy brazing sheet according to claim 3, wherein the cladding thickness a ($\mu$m) of the filler alloy applied on the inside of the hollow structure, the Mg content X (mass %) of the core material, and the Mg content Y (mass %) of the filler alloy satisfy relationship of $(X+Y) \leq -a/60+1.5$.

8. The aluminum alloy brazing sheet according to claims 7, wherein said sheet is a brazing sheet for use in a heat exchanger.

9. The aluminum alloy brazing sheet according to claim 5, wherein the cladding thickness a ($\mu$m) of the filler alloy applied on the inside of the hollow structure, the Mg content X (mass %) of the core material, and the Mg content Y (mass %) of the filler alloy satisfy relationship of $(X+Y) \leq -a/60+1.5$.

10. The aluminum alloy brazing sheet according to claims 9, wherein said sheet is a brazing sheet for use in a heat exchanger.

11. An aluminum alloy brazing sheet, which is suitable to the brazing method according to claim 2, wherein one side or both sides of the aluminum or aluminum alloy core material is clad with the Al—Si-based filler alloy, and a cladding thickness a ($\mu$m) of the filler alloy applied on the inside of the hollow structure, a Mg content X (mass %) of the core material, and a Mg content Y (mass %) of the filler alloy satisfy relationships of $(X+Y) \leq a/60+0.5$ and $X>Y$.

12. The aluminum alloy brazing sheet according to claims 11, wherein said sheet is a brazing sheet for use in a heat exchanger.

13. The aluminum alloy brazing sheet according to claim 11, wherein the Mg content of the filler alloy applied on the inside of the hollow structure is less than 0.2% by mass, and the Mg content of the core material is 0.05 to 1.0% by mass.

14. The aluminum alloy brazing sheet according to claims 13, wherein said sheet is a brazing sheet for use in a heat exchanger.

15. The aluminum alloy brazing sheet according to claim 11, wherein the cladding thickness a ($\mu$m) of the filler alloy applied on the inside of the hollow structure, the Mg content X (mass %) of the core material, and the Mg content Y (mass %) of the filler alloy satisfy relationship of $(X+Y) \leq -a/60+1.5$.

16. The aluminum alloy brazing sheet according to claims 15, wherein said sheet is a brazing sheet for use in a heat exchanger.

17. The aluminum alloy brazing sheet according to claim 13, wherein the cladding thickness a ($\mu$m) of the filler alloy applied on the inside of the hollow structure, the Mg content X (mass %) of the core material, and the Mg content Y (mass %) of the filler alloy satisfy relationship of $(X+Y) \leq -a/60+1.5$.

18. The aluminum alloy brazing sheet according to claims 17, wherein said sheet is a brazing sheet for use in a heat exchanger.

19. An aluminum alloy brazing sheet, which is suitable to the brazing method according to claim 1, wherein said sheet has a structure of at least 4 layers claded in the sequence of a filler alloy, a diffusion prevention layer, a core material and a filler alloy, and said core material has a composition containing 0.2 to 1.2% by mass of Si, 0.05 to 2.0% by mass of Fe, 0.1 to 1.2% by mass of Cu, 0.05 to 2.0% by mass of Mn and 0.2 to 1.5% by mass of Mg, with the balance being Al and inevitable impurities.

20. The aluminum alloy brazing sheet according to claims 19, wherein said sheet is a brazing sheet for use in a heat exchanger.

21. The aluminum alloy brazing sheet according to claim 19, wherein the filler alloy on the side adjacent to the diffusion prevention layer (hereinafter to be referred to as an outer filler alloy) is an Al—Si-series filler alloy, and the filler alloy on the side adjacent to the core material (hereinafter to be referred to as an inner filler alloy) contains 7 to 12% by mass of Si, 0.5 to 8.0% by mass of Cu and 0.5 to 6% by mass of Zn, with the balance being Al and inevitable impurities.

22. The aluminum alloy brazing sheet according to claims 21, wherein said sheet is a brazing sheet for use in a heat exchanger.

23. An aluminum alloy brazing sheet, which is suitable to the brazing method according to claim 2, wherein said sheet has a structure of at least 4 layers claded in the sequence of a filler alloy, a diffusion prevention layer, a core material and a filler alloy, and said core material has a composition containing 0.2 to 1.2% by mass of Si, 0.05 to 2.0% by mass of Fe, 0.1 to 1.2% by mass of Cu, 0.05 to 2.0% by mass of Mn and 0.2 to 1.5% by mass of Mg, with the balance being Al and inevitable impurities.

24. The aluminum alloy brazing sheet according to claims 23, wherein said sheet is a brazing sheet for use in a heat exchanger.

25. The aluminum alloy brazing sheet according to claim 23, wherein the filler alloy on the side adjacent to the diffusion prevention layer (hereinafter to be referred to as an outer filler alloy) is an Al—Si-series filler alloy, and the filler alloy on the side adjacent to the core material (hereinafter to be referred to as an inner filler alloy) contains 7 to 12% by mass of Si, 0.5 to 8.0% by mass of Cu and 0.5 to 6% by mass of Zn, with the balance being Al and inevitable impurities.

26. The aluminum alloy brazing sheet according to claims 25, wherein said sheet is a brazing sheet for use in a heat exchanger.

27. A method of manufacturing an aluminum alloy heat exchanger, comprising using the method of brazing aluminum or aluminum alloy materials according to claim 1.

28. A method of manufacturing an aluminum alloy heat exchanger, comprising using the method of brazing aluminum or aluminum alloy materials according to claim 2.

* * * * *